US012002444B1

(12) United States Patent
Oyman et al.

(10) Patent No.: US 12,002,444 B1
(45) Date of Patent: Jun. 4, 2024

(54) COORDINATED MULTI-DEVICE NOISE CANCELLATION

(71) Applicant: Amazon Technologies, Inc., Seattle, WA (US)

(72) Inventors: Basak Oyman, Mountain View, CA (US); Kofi Anim-Appiah, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 17/853,006

(22) Filed: Jun. 29, 2022

(51) Int. Cl.
*G10K 11/16* (2006.01)
*G10K 11/178* (2006.01)
*G10L 25/78* (2013.01)

(52) U.S. Cl.
CPC .......... *G10K 11/1785* (2018.01); *G10L 25/78* (2013.01)

(58) Field of Classification Search
CPC .... G10K 11/1785; G10K 11/178; G10L 25/78
USPC ............................................... 381/71.1, 71.8
See application file for complete search history.

(56) References Cited

U.S. PATENT DOCUMENTS

2019/0139530 A1* 5/2019 Jarvinen .......... G10K 11/17837

* cited by examiner

*Primary Examiner* — Ammar T Hamid
(74) *Attorney, Agent, or Firm* — Pierce Atwood LLP

(57) ABSTRACT

A system that coordinates audio output among multiple devices to perform noise cancellation in one room of noise resulting from audio output of another. The system uses information from the source of the audio output along with calibration information to coordinate the noise cancellation, which may involve delaying of audio output by the aggressor device.

20 Claims, 10 Drawing Sheets

400

COORDINATED MULTI-DEVICE NOISE CANCELLATION

BACKGROUND

Computing devices can be used to output audio under a variety of conditions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
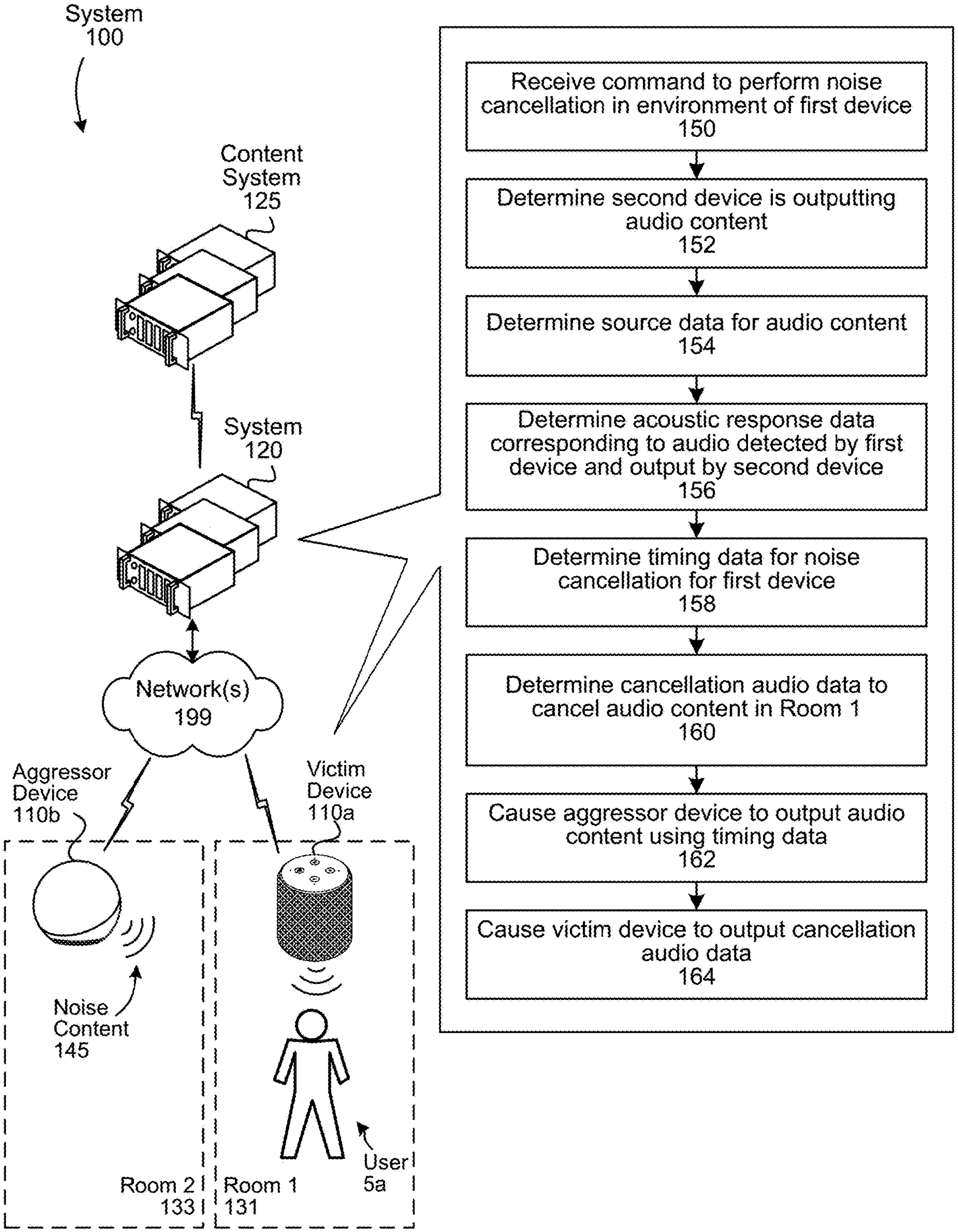
FIG. 1 is a conceptual diagram illustrating a system for coordinated multi-device noise cancellation, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Natural Language Generation (NLG) includes enabling computers to generate output text or other data in words a human can understand, such as sentences or phrases. Text-to-speech (TTS) is a field of computer science concerning transforming textual and/or other data into audio data that is synthesized to resemble human speech. ASR, NLU, NLG, and TTS may be used together as part of a speech-processing/virtual assistant system.

A user can interact with a speech-processing system using voice commands and/or other input, and the speech-processing system may perform actions for and/or on behalf of the user in response. Certain functions of the speech-processing system may be divided and/or shared between different components of the speech-processing system. The user may interact with a user device, a back-end server (e.g., a cloud service), or other system components. For example, a user may utter a command, such as "Alexa, play a podcast." The user device and/or cloud service may have speech processing components to identify a command or request represented in the speech and determine a corresponding action to perform. The user device and/or cloud service may include other components, such as an application or "skill" configured to perform the requested action. In this example, the skill may provide media content for playback on the device.

A speech-controlled device, or other device, may be used to output some desired audio. That audio may take the form of music, a podcast, radio broadcast, audio for a video, or other output. As can be appreciated, a user's enjoyment of listening to such desired audio may be interrupted or lessened by undesired audio that may reach the user. Such undesired audio is referred to as noise. Noise may be in the form of environmental/diffuse noise (such as the hum of an air conditioner or engine, general highway noise, or the like), specific directional noise (such as someone speaking from a particular direction, audio being output by another device, etc.) and/or other noise.

Active noise cancellation (ANC) is a known scheme used in certain devices to reduce the impact background noise has on a listening user. ANC operates by using a microphone to capture a representation of the noise to be eliminated and then outputting, through a loudspeaker, an inverted soundwave of the noise. The inverted soundwave thus "cancels" the soundwave of the noise as they both reach the user's ears, thus reducing the impact of the noise on the listening user. To operate properly, the inverted cancelling soundwave needs to match the inverse of the noise as closely as possible, or else the user will experience audio artifacts or other unwanted effects, thus resulting in a poor user experience. Because of the need to closely match the cancelling noise with the actual noise, ANC is typically used in headphones for ambient noise cancellation, as a headphone's local microphones may capture a representation of the ambient noise in a form that closely represents the noise as experienced by the user. That captured representation is then neutralized before it reaches the ear through the headphones. This technology is devised mainly for use in headsets with co-located speaker drivers and noise-estimating microphones. ANC technology relies on the fact that the user's ears are co-located with the speaker drivers and the microphone array, thus resulting in the user's ears and the noise-estimating microphones to experience approximately the same acoustic channel. The headset generates sound in anti-phase to the unwanted noise measured by the microphone array, resulting in the two sounds cancelling each other out without the need to make accommodation for generally two different acoustic responses (at the ear from the location of speaker driver, and at the ear from the location of the microphone array.) In order for such operations to work well the anti-phase signal must be generated with very little delay—less than the upper limit below which the human auditory system cannot perceive the delay between the two sounds. That is, an anti-wave intended to cancel the noise must reach the ear within a certain time of the sound wave of the noise itself or else the noise cancellation will be ineffective and/or cause unwanted audio effects to be experienced by the user.

Such noise cancellation techniques have typically not been used outside of headphones/wearables due to the technical requirements of estimating the noise as experienced by the user (e.g., at the user's ear) and timing the anti-noise sound wave to arrive at the user at the same time as the noise sound wave.

Offered is a system and techniques for incorporating noise cancellation using a combination of devices whose audio output may be detected in the environment of the other. Such a system may include, for example, free standing devices such as a smart speaker such as an Amazon Echo speaker, television, home stereo with appropriate computing components, or other such device(s) capable of audio output. Such devices may be located at different positions in different environments, but the audio from one may still reach the environment of another. For example, one device may be playing audio in one room of the house and a user in another room can hear the audio but wants to cancel it, as it is undesired for that particular user. The system may use coordinated approaches to determine the source of the interfering noise (e.g., podcast, playlist, etc.) and use data representing that noise, along with acoustic response data of the acoustic channels between the devices, to determine cancellation audio that can be played back in the desired location. The system can also control the timing of the devices so that the interfering audio and cancellation audio may be coordinated so that they reach the user at approximately the same time, thus cancelling the noise.

Although the description below focuses on the example of devices being in the same house, it can be appreciated that the system and techniques described herein may apply for a number of different situations such as an office, other structure, etc. where a user in an environment of a first device may hear (and wish to cancel) noise/audio being output by a second device in a different location. The system may coordinate the audio playback of the two devices so that the cancellation audio is played by the first device in a manner that cancels the impact of the noise from the second device as experienced by the user.

Thus, described is a system and method for mitigation of unwanted sound experienced at one location in a house (the "victim" location) having a device (the "victim" device). The unwanted sound originates from another location (the "aggressor" location) in the same house by a device (the "aggressor" device) at that location. Playback of the content from the system in one room (the aggressor room) may be objectionable to someone in a room in another part of the house (the victim room). The devices (e.g., the aggressor device and victim device) may be connected to one or more back-end component(s), such as a cloud server, home server, etc. which has information about the content playing through each of the individual devices. The individual devices may be linked through one or more user profiles and/or be connected to similar music/audio playback system(s). For example, the devices may be connected to one or more similar online music-streaming service (e.g., Amazon Music or the like) which can simultaneously deliver content to two different audio playback systems in a house—each located in a different room. (The devices may also be connected to different audio services where the information about their audio output is available to/manageable a centralized system/component.) The system may thus coordinate access to the source content of the undesired sound not only at the device that it outputting that sound (the aggressor device) but also at (or close to) the location where the mitigation is desired (the victim device). The audio playback system in the victim room makes use of its real-time access to the source content being played back by the aggressor system to mitigate the undesired sound in the victim room. Specifically, the system can use calibration information about the acoustic channel between the aggressor device and listening location (e.g., the victim room) to determine cancellation audio data which will cancel the aggressor audio in the victim room. Further, the system may control the timing of the output of audio content by the aggressor device (for example by buffering such audio and/or instructing the aggressor device when to output the audio) such that the aggressor audio arrives at the cancellation location (e.g., the room in which the listening user is located) within a certain time range as the cancellation audio to improve cancellation results.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 illustrates a system 100 for coordinating noise cancellation across devices according to embodiments of the present disclosure. As shown in FIG. 1, the system 100 may include multiple devices 110, local to a user 5, and connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may include multiple components to facilitate speech processing, such as, discussed below in reference to FIG. 6, an orchestrator component 630, an ASR component 650, and an NLU component 660. The system 120 may further include one or more skill components 625, which may be in communication with a skill/content system(s) 125 external to the system 120. Such skills/skill/content system(s) may coordinate the providing of audio data to one or more device(s) 110, such as music, podcasts, or the like, which may be requested by a user using a voice user interface (VUI), graphical user interface (GUI), companion application/device, or the like. The system 120 may also include, as described later herein, a profile storage 670, a TTS component 680, and a user recognition component 695 to facilitate processing of user inputs and generating outputs.

One or more skill components 625 may communicate with one or more skill systems 125. A "skill" may refer to software, that may be placed on a machine or a virtual machine (e.g., software that may be launched in a virtual instance when called), configured to perform one or more actions in response to user inputs processed by the NLU component, such as playing music, turning on noise cancellation, or the like.

Figure 6:
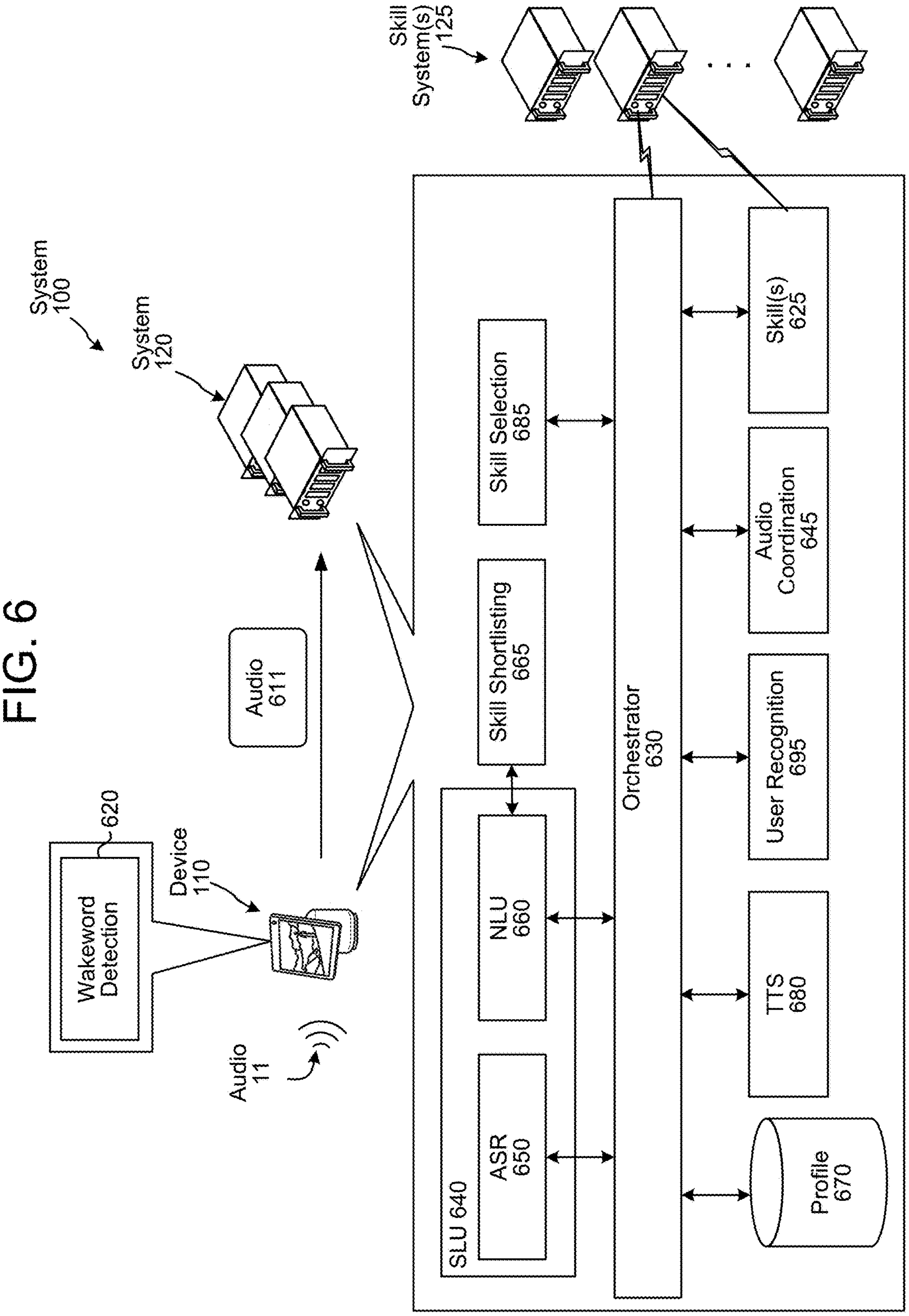
FIG. 6 is a conceptual diagram illustrating example system components that may be used to process a user input, according to embodiments of the present disclosure.

The system may also include an audio coordination component 645 (shown in FIG. 6). The audio coordination component 645 may perform operations such as those discussed with regard to FIG. 1 and other noise cancellation operations discussed herein. Although the description herein focuses on the noise cancellation operations being performed by system 120, the audio coordination component 645 may reside with the system 120, with device 110*a*, with device 110*b* or some combination thereof, and thus the operations discussed herein may be performed by one or more of system 120, device 110*a*, 110*b*, or the like.

As shown in FIG. 1, a first device 110*a* may exist in a first room 131 in which a first user 5*a* is located. A second device 110*b* may exist in a second room 133 and may be outputting audio, for example music or the like being listened to by a second user (not shown). The audio output by the second device 110*b* in the second room 133 may be loud enough to be heard by user 5*a* in the first room 131. Such audio may be undesired for user 5*a* and thus for the present example the audio output by the second device 110*b* is referred to here as noise content 145 and the second device is referred to as the aggressor device 110*b*. The first device, in room 1 131 is referred to as the victim device 110*a*.

The user 5*a* may execute a command for the system to initiate noise cancellation. This command is received (150) by the system 120. The command may be entered into a screen of device 110*a*, into a mobile device, wearable, or other device (not shown) of the user 5*a*. The command may also be spoken by the user (for example, "Alexa, start noise cancellation") where the audio of the command is captured by the victim device 110*a* (or another device) and speech processing is performed on the resulting audio data to determine the command to perform noise cancellation. The system 120 may also determine that the command corresponds to the environment of the first device 110*a* (e.g., the first room 131). The system 120 may make this determination based on the device that received the command (e.g., 110*a*), some information about the location of the user 5*a* (e.g., from image data showing the user, from data from a user's wearable or mobile device indicating the user's location, or the like).

The system 120 may determine (152) that the second device is outputting audio content. This may be performed by identifying a user profile associated with the victim device 110*a*. The user profile may also identify the aggressor device 110*b* (and/or other devices) as indicated as being within a same home (or otherwise within audible range) as each other. The system 120 may use information about the aggressor device 110*b* to determine that it is receiving audio content from a source (e.g., content system 125) and that the aggressor device 110*b* is currently in playback mode. The system 120 may also determine, for example from the aggressor device 110*b*, a volume setting of the aggressor device 110*b* and determine that the volume setting is such that the aggressor device 110*b* may be outputting audio in a manner that its audio (e.g., noise content 145) is audible in the first room 131.

The system 120 may determine (154) source data for the audio content being output by the aggressor device 110*b*. For example, information available to the system 120 (such as through a user profile or the like), information provided by the aggressor device 110*b* itself, or the like, may indicate that a particular source device/system (e.g., content system 125*a*) is providing the audio content for the aggressor device 110*b*. The system 120 may then obtain the source data for that audio content. For example, the system 120 may indicate to the content system 125*a* that audio data representing the audio content should be sent to system 120 in addition to aggressor device 110*b*. In another example, the system 120 may receive the source data from the aggressor device 110*b* itself. The system 120 may also receive the source data in some other manner. In this manner the system 120 may access the source data that is resulting in the noise content rather than using a microphone to estimate the noise for purposes of cancellation, which is what may happen in for ANC implemented, for example, using headphones/earbuds or the like.

The system may determine (156) acoustic response data corresponding to audio detected by the first device and output by the second device. This acoustic response data may represent the acoustic channel/acoustic response between the rooms/devices and thus may represent how audio output from the second device is experienced in the first room 131. The acoustic response data may be determined ahead of time and referred to by the system 120 during a noise cancellation operation. Alternatively, or in addition, the system may perform a brief calibration by using a test audio signal (or the known source data) to determine what audio is being output by the aggressor device 110*b* and comparing that to the input audio detected by the microphone(s) of the victim device 110*a* and/or other microphone(s) that may be in other devices in the first room 131. Further details about determining these cross-room acoustic responses and the resulting acoustic response data are discussed below, for example in reference to FIG. 2.

The system 120 may determine (158) timing data for noise cancellation to be performed by the first device 110*a*. This timing data may correspond to a delay during which the source data may be buffered (for example by the content system 125, system 120, and/or aggressor device 110*b*) before being played back. This will ensure that the ultimate audio output by the aggressor device 110*b* will arrive at the appropriate location (e.g., at a location in the first room 131) at the same time as cancellation audio that is output by the victim device 110*a*. The timing data may be determined as part of determining the acoustic response data, where the acoustic response data incorporates timing aspects that result from the victim device's detection of audio output by the aggressor device.

The system 120 may use the source data and acoustic response data to determine (160) cancellation audio to be output by the victim device 110*a*. The cancellation audio will be configured using the acoustic response data (which represents how sound from the aggressor device 110*b* is experienced in room 131) so that the system 120 can estimate how audio of the noise content 145 is experienced in room 131 (or even at a particular location in room 131) so that the system 120 may determine the inverse of that audio, which will be represented by the cancellation audio data.

The system 120 may then cause (162) the aggressor device 110*b* to output audio content (e.g., from the content system 125) using the timing data. For example, the system 120 may receive the source data from the content system 125 and buffer it for a period of time before sending it to the aggressor device 110*b*. Alternatively, or in addition, the system 120 may send a command to the aggressor device 110*b* to only output further audio/noise content 145 after a certain period of time, sufficient to allow calculation/distribution of, corresponding cancellation audio data. In this way the system 120 may exert some control on the source of the noise, thus allowing the system 120 to coordinate among multiple devices to cancel undesired audio/noise in the undesired location (e.g., the victim room) while allowing the audio to continue, though in a coordinated way, in its original location (e.g., the aggressor room, where the audio in question may be desired by a listener in that room). Along with the delay, the system 120 may cause the aggressor device 110*b* to output an indication (either visual, audio and/or some other mechanism) that noise cancellation is beginning to explain that output by the aggressor device

110*b* may be delayed/buffered. The system 120 may also cause (164) the victim device 110*a* to output the cancellation audio data. The system 120 may thus control/coordinate different audio outputs by both aggressor device 110*b* and victim device 110*a* to result in cancellation/reduction of the noise content 145 as experienced in the first room 131 by user 5*a*.

Further details regarding operation of the system are described below.

As noted, in order to achieve mitigation/cancellation of undesired sound in a particular room, an estimation may be made of the acoustic impulse response at the user's ears from each source of undesired sound. This requires a combination of information about the actual source content (which may be obtained from, for example, content source 125) as well as information about how sound output by one device is detected at the location of the listener. To do this, the system 120 may perform calibration operations to determine acoustic response data that represent how the microphone(s) of one device received audio output by another device in another room. This acoustic response data may then be used to estimate how specific content will be received by that device so the system can generate a corresponding cancelling audio.

These acoustic responses may be estimated with the use of one or more microphones/microphone arrays. In order to mitigate undesired sound in one room originating from the other rooms, each acoustic response at effectively the user's ears from aggressor speakers at other locations in the house must be estimated rather than precisely calculated (as may be the case with earbuds/headphones). This is because the devices are neither co-located with each other nor with the user's ears. This results in sounds emanating from other rooms reaching the user's ears through reflections from the walls, ceilings, floors and other surfaces. Such reflected sound waves may arrive at a particular location later than the direct line-of-sight sound waves as the reflected waves travel longer distances. Reflected waves are also weaker in intensity due to power loss over longer distances. Hence, each acoustic response between rooms may be estimated individually in order to calibrate and time-align the cancelling sound wave to mitigate the undesired sound at the user's ears. As there are six walls in a typical room (including the ceiling and the floor), it is expected in many situations that at least six reflected sound waves may reach a user's ears.

To determine an estimated acoustic response, the system 120 may conduct a calibration operation either "real-time" following a user request for noise cancellation but prior to actually conducting the noise cancellation. Alternatively, or in addition, the system may perform calibration during a special calibration/setup session where it calculates acoustic response data and then stores it for later use during a subsequently invoked noise cancellation operation. To determine acoustic response information and corresponding acoustic response data, the system 120 first plays a sounding sequence (e.g., a predetermined sequence of a calibration signal) from each device to determine the acoustic responses in between the rooms as perceived by the device that resides in each room.

The calibration sequence may cover and entire frequency band in the auditory range to capture the full frequency response of the room that a user may be in. The calibration sequence may be played individually through each speaker at a time to resolve for the different acoustic responses coupled to the user's ears from different speakers. The loudness on the calibration sound can be set to less than 0 dBA in order to avoid disturbance to the users in the building. In such a case, a chirp sound along with time repetitions can be used to provide robustness over the ambient noise. Once the acoustic responses are estimated as picked up by an array of connected microphones, the system 120 may then determine acoustic response data that may be used to, at runtime, prepare a cancellation sound that nullifies the undesired sounds coming from the other devices.

Figure 2:
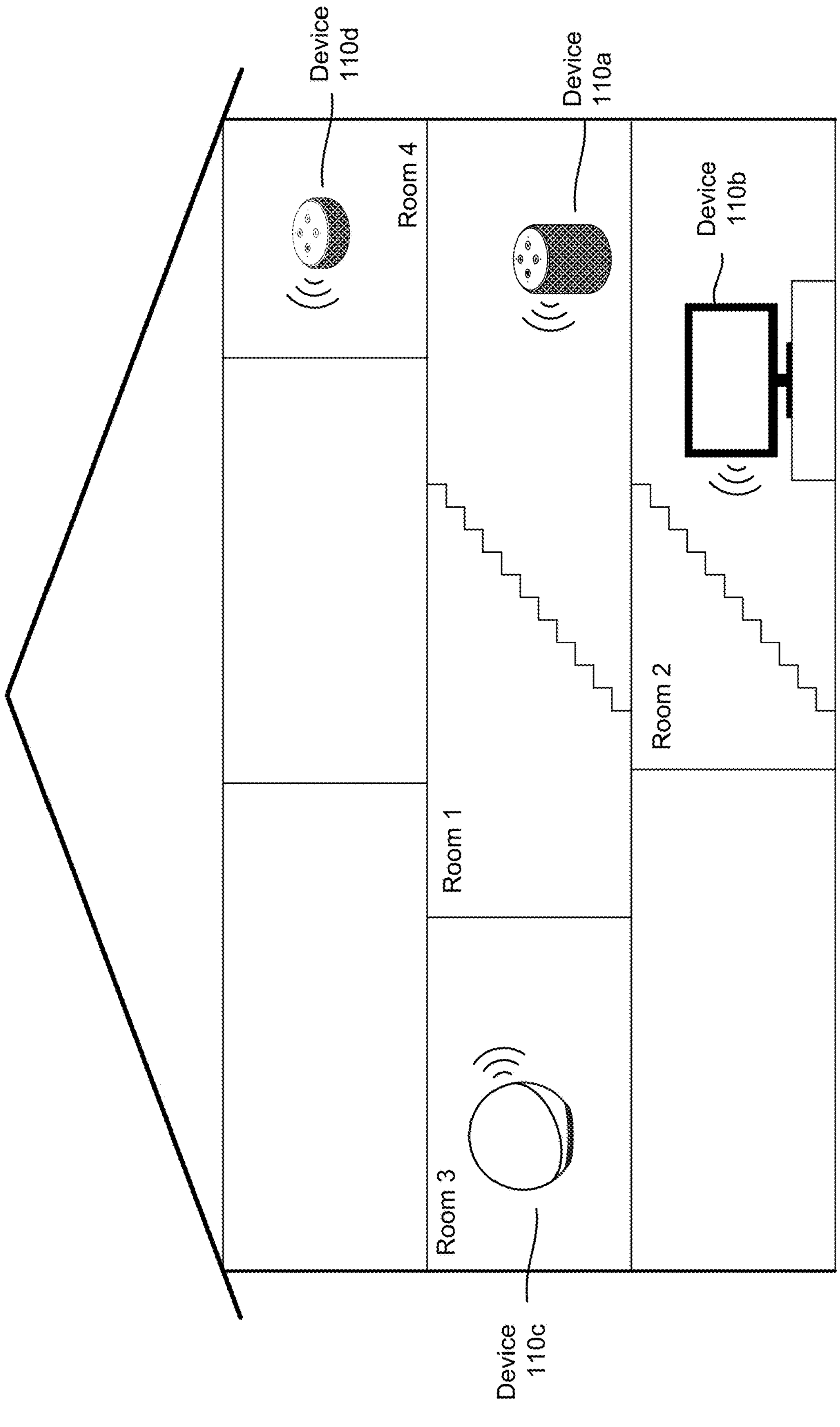
FIG. 2 illustrates devices across rooms for purposes of estimating acoustic responses, according to embodiments of the present disclosure.

For example, as shown in FIG. 2, a structure may include a variety of rooms where certain of those rooms have devices within them. As illustrated, room 1 has device 110*a*, room 2 has device 110*b*, room 3 has device 110*c*, and room 4 has device 110*d*. Although each illustrated device has microphone(s) and speaker(s) in certain circumstances one or more devices may only have a speaker and/or only a microphone, which may limit its operation in the context of the present disclosure to one of audio output and/or audio input respectively. The system 120 may first cause a calibration signal to be output by one device (e.g., device 110*a*) and determine the microphone data from the other devices (e.g., devices 110*b*, 110*c*, and 110*d*) representing their capture of the calibration sequence. The system 120 may then repeat the process for the different devices (e.g., outputting sound by device 110*b* and detecting audio with devices 110*a*, 110*c*, and 110*d*, and so forth). As used herein a calibration signal may represent a known signal played out by one or more loudspeakers and captured by one or more microphones to determine acoustic response information. Acoustic response data may represent the data that corresponds to the acoustic response information that results from the calibration process.

The system 120 may also output two calibration sequences by different devices (e.g., 110*a* and 110*b*) at the same time so that the system 120 can determine the acoustic response of the other devices (e.g., 110*c* and 110*d*) corresponding to audio output by multiple devices at once. Such multiple device acoustic response/acoustic response data may be used when there are multiple aggressor devices operating that are causing noise content to reach a victim room/user. To mitigate such multiple aggressors, the system may perform noise cancellation operations as described herein, only the cancellation output data eventually output by the victim device will be determined and configured in a manner that should mitigate the noise experienced by the user. Note that in such a scenario, the time information used to delay the content output by a first aggressor may be different than the time information used to delay content output by a second aggressor depending on the aggressor device's respective distance to the victim user.

As noted, calibration may be performed ahead of time and/or following a noise cancellation command. In the latter scenario a user submits a command to perform noise calibration. The system 120 then causes a sounding sequence to be played from the aggressor device and recorded by one or more connected microphones at the user location, for example microphones of a victim device located in the user's room. In another scenario, the user may have a device, such as a mobile phone, wearable device, or the like, that may be equipped with one or more microphones and be co-located with the user more precisely than a device that simply may be in the same room. If so, the system 120 may capture the reception of the sounding sequence on that wearable device. The system 120 may also cause the victim device to output a sounding sequence and capture the reception of that sounding sequence on the wearable device. The recorded signals from the microphones may be sent to the system 120 or other device for acoustic-response estimation/calculation of acoustic response data, after which a cancellation source is calculated (using the known audio source data) to nullify the aggressor sound reaching at the user location. The cancellation sound is played through the user's (victim) speaker. If the user wants to play music or other audio at the same time as the aggressor sound, the system 120 may combine the desired content and the cancellation sound for effective simultaneous playback through the victim device. This will result in the user experiencing both the desired audio and cancellation of the undesired noise audio coming from the aggressor device.

Figure 3:
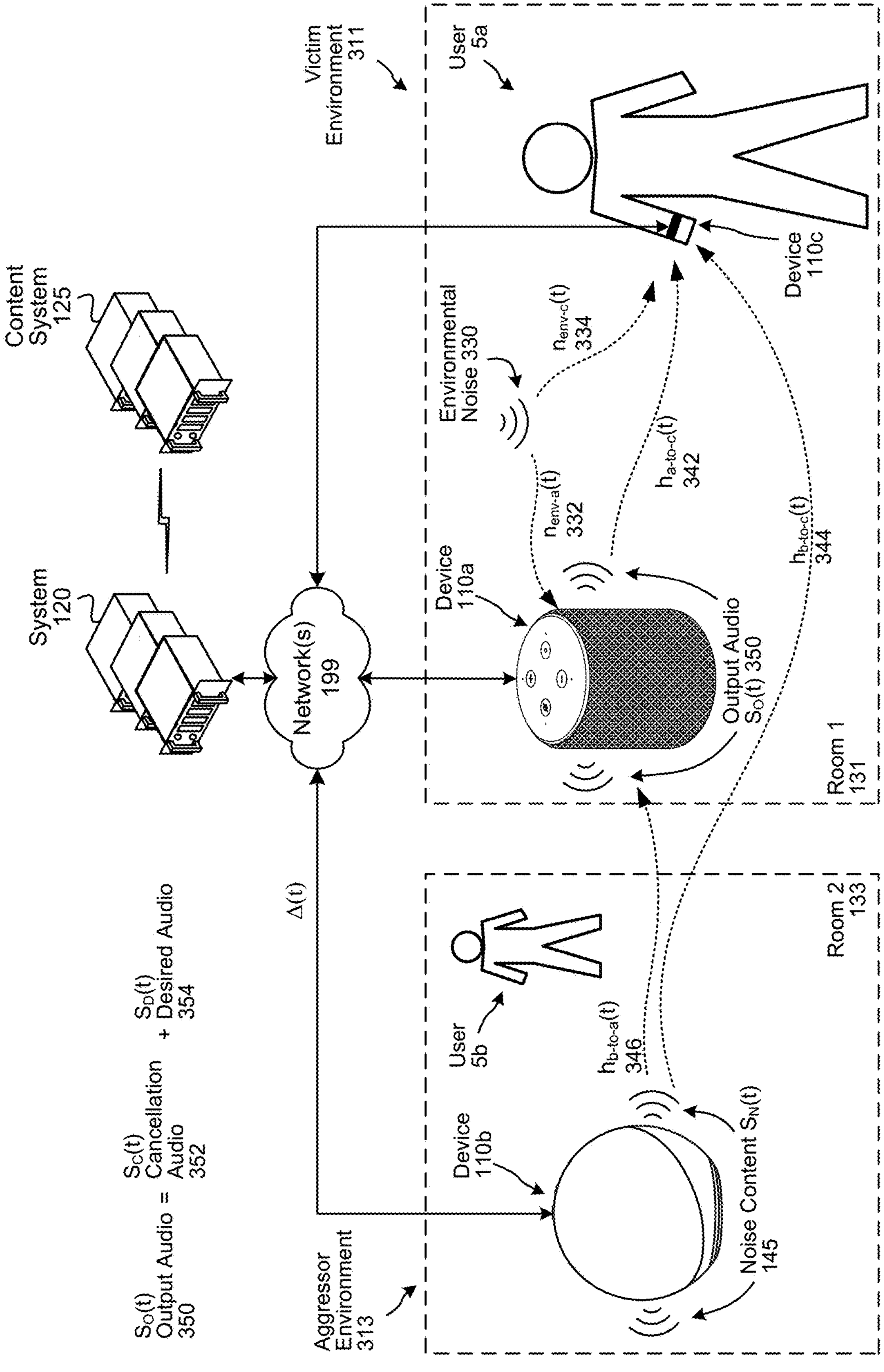
FIG. 3 illustrates coordinated multi-device noise cancellation, according to embodiments of the present disclosure.

FIG. 3 illustrates further components that may be used for coordinated noise cancellation. In the example of FIG. 3, as with the example of FIG. 1, a victim environment 311 may include a first user 5*a* is in a first room 131 which includes a first device 110*a*. An aggressor environment 313 may include a second room 133 that includes a second device 110*b* that is outputting audio being listened to by a second user 5*b*. That audio, however, is loud enough that it is detectable in the first room 131. Thus, for the present example, the first user 5*a* shall be referred to as the victim user, the first room 131 as the victim room, the first device 110*a* as the victim device, the second room 133 as the aggressor room, the second device 110*b* as the aggressor device and the audio being output by the second device as the noise content 145 (even though it may be desired content for the second user 5*b*).

As shown, the first user 5*a* may also have another device, referred to here as third device 110*c*, which the user may carry on their person. Third device 110*c* may be a mobile device (such as a smartphone), smart wearable device (such as a smartwatch), or other device such as a simple wearable that may have limited components such as a microphone(s)/microphone array and communication components. The purposes of the third device 110*c* is to capture and report detected audio signals as explained herein so thus should have sufficient components to perform these operations but may have other components depending on system configuration. Though in certain embodiments it may be a limited function device, thus allowing third device 110*c* to have higher battery life, lower cost, etc. By capturing audio signals using the third device 110*c* the system 120 may user more precise estimations of the relevant acoustic response(s) for purposes of calculating and using acoustic response data in noise cancellation operations.

The proximity of the microphone array of the third device 110*c* to the first device 110*a* may be estimated by tracking the Received Signal Strength Indicator (RSSI) (or other signal metric) in between the two devices, where distance may be estimated using information from the radios on the two devices. Tracking this proximity may enhance system performance to more closely cancel noise at the precise location of the first user 5*a*. For example, if the devices 110*a* and 110*c* are within a certain range of each other, then additional microphones on the first device 110*a* may also be used to pick up the ambient noise.

As shown, the second user 5*b* is in the second room 133 playing some audio (e.g., music, an audio-book, video soundtrack, or the like) through the second device 110*b* with the source data for the audio being provided from server 120, content system 125, or other source available to the system 120. The sound from the second device 110*b* reaches the first room 131 in the form of noise content $S_N(t)$ 145. The first device 110*a* in the first room 131 may present output audio $S_O(t)$ 350 which may include cancellation audio $S_C(t)$ 352 plus any desired audio $S_D(t)$ 354. The cancellation audio $S_C(t)$ 352 represents an inverse of the noise content $S_N(t)$ 145 as experienced in the first room 131 (for example at the location of first user 5*a*). The cancellation audio $S_C(t)$ 352 may also be determined so that it cancels or mitigates any ambient environmental noise 330. The desired audio $S_D(t)$ 354 represents any audio content that the first user 5*a* wishes to listen to. Such desired audio $S_D(t)$ 354 may result from desired source audio data provided by server 120, content system 125, or other source available to the system 120. If the first user 5*a* has indicated no such desired audio $S_D(t)$ 354 the output audio $S_O(t)$ 350 may only include the cancellation audio $S_C(t)$ 352.

The cancellation data used to produce the cancellation audio $S_C(t)$ 352 is determined by system 120 using both acoustic response data (corresponding to the acoustic response between device 110*b* and the environment of the user first 5*a*) and source data (corresponding to the source of the noise content $S_N(t)$ 145, for example as obtained from content system 125).

The first device 110*a* includes a loudspeaker and microphone(s)/microphone array for purposes of both capturing spoken user commands (to be processed, for example, using the components discussed below in reference to FIG. 6) but also for estimation of acoustic response/ambient noise. This acoustic response information may result in the acoustic response data which may be processed along with the source data to determine the cancellation data (which is used to produce the cancellation audio $S_C(t)$ 352).

The room 131 may also be subject to certain environmental noise 330 separate and apart from the noise content 145. The first device 110*a* may experience the environmental noise 330 as audio $n_{env-a}(t)$ 332 (determined by the microphone(s) of the first device 110*a*) and the third device 110*c* may experience the environmental noise 330 as audio $n_{env-c}(t)$ 334 (determined by the microphone(s) of the third device 110*c*). Such environmental noise information may be provided to the server 120 and/or other component(s)/device(s) that may be performing operations related to noise cancellation.

To determine the acoustic response data from the acoustic response of the device(s), the system may perform the following operations. Let $x_1(t)$ represent a calibration signal played out/presented by the aggressor speaker device 110*b*. Let $x_2(t)$ represent a calibration signal played out/presented by the victim speaker device 110*a*. Such calibration signals may contain energy at frequencies spanning the human auditory range. The source data for these signals can either be sent to devices 110*a* and 110*b* from the system 120, or the signals can be generated locally at those devices.

$x_1(t)$ and $x_2(t)$ may be played separately to estimate the acoustic response at the microphone of device 110*c* (e.g., at the location of the first user 5*a*). Thus output of audio due to $x_1(t)$ may result in determining the acoustic response between device 110*b* and device 110*c* while output of audio due to $x_2(t)$ may result in determining the acoustic response between device 110*a* and device 110*c*.

There are thus three acoustic responses that may be considered for determination of the acoustic response data. The first, $h_{a\text{-}to\text{-}c}(t)$ 342, is the acoustic response experienced by device 110*c* from audio output by device 110*a*. The second, $h_{b\text{-}to\text{-}c}(t)$ 344, is the acoustic response experienced by device 110*c* from audio output by device 110*b*. The third, $h_{b\text{-}to\text{-}a}(t)$ 346, is the acoustic response experienced by device 110*a* from audio output by device 110*b*. Others may also be considered for other devices not shown in FIG. 3 (for example the devices discussed with respect to FIG. 2). If device 110*c* is close to device 110*a*, then $h_{b\text{-}to\text{-}c}(t)$ 344 may be similar to $h_{b\text{-}to\text{-}a}(t)$ 346. These acoustic responses may generally be slowly time-variant so the calibration can be repeated periodically to accommodate time variations.

For purposes of illustration, $y_1(t)$ may represent the electrical signals captured by the microphone(s) of device 110*a* by calibration signal $x_1(t)$ output by the aggressor speaker device 110*b*. Similarly, $y_2(t)$ may represent the electrical signals captured by the microphone(s) of device 110*c* by calibration signal $x_1(t)$ output by the aggressor speaker device 110*b*. Further, $y_3(t)$ may represent the electrical signals captured by the microphone(s) of device 110*c* by calibration signal $x_2(t)$ output by the victim speaker device 110*a*. Those detected signals may be represented as:

$$y_1(t)=h_{b\text{-}to\text{-}a}(t)*x_1(t)+n_{env\text{-}a}(t) \quad \text{(Equation 1)}$$

$$y_2(t)=h_{b\text{-}to\text{-}c}(t)*x_1(t)+n_{env\text{-}c}(t) \quad \text{(Equation 2)}$$

$$y_3(t)=h_{a\text{-}to\text{-}c}(t)*x_2(t-T)+n_{env\text{-}c}(t) \quad \text{(Equation 3)}$$

where the operator * represents time convolution. Output of signal $x_2(t)$ may begin T seconds after the start of playback of calibration signal $x_1(t)$. As can be appreciated $y_1(t)$ and $y_2(t)$ may be similar if devices 110*a* and 110*c* are approximately co-located. In such a case, both signals can be used to improve the estimation accuracy of the acoustic responses.

As $x_1(t)$ and $x_2(t)$ are known calibration signals, standard system identification methods can be used to obtain the estimates of the acoustic responses, so long as the corresponding speaker-output sound-pressure levels are much higher than the ambient environmental noise 330. The resulting acoustic response information (representing the respective impact of different device's audio on respective other devices) may be stored as acoustic response data for use during noise cancellation. Such acoustic response data may be stored along with a user profile associated with the user, for example in user profile storage 670 as discussed below.

Once the acoustic response data is available, the server 120 (or other component/device) may determine the inverse response of the noise content 145 that corresponds to the particular acoustic response so that the victim device 110*a* may output audio $S_O(t)$ 350 that may result in cancellation of the noise content $S_N(t)$ 145 as experienced by the first user. Using an appropriate delay and gain (if not already incorporated into the acoustic response data), this has the effect of destructive interference of the two sound-pressure waves at the location of user 5*a*, thus resulting in a reduction, if not entire cancellation, of the noise content $S_N(t)$ 145 at the location of user 5*a*.

As noted above, the first device 110*a* in the first room 131 may present output audio $S_O(t)$ 350 which may include cancellation audio $S_C(t)$ 352 plus any desired audio $S_D(t)$ 354. The cancellation audio $S_C(t)$ 352 represents a version of the source signal of the noise content $S_N(t)$ 145 as adjusted to account for the acoustic response data. The cancellation audio $S_C(t)$ 352 may also be determined to cancel or mitigate any new or existing ambient noise. The cancellation audio $S_C(t)$ 352 may also be adjusted in intensity by device 110*a* in response to control information received from system 120.

Determination of the cancellation audio $S_C(t)$ 352 may be performed as described herein. As discussed above, the source data for the noise content $S_N(t)$ 145 and for the desired audio $S_D(t)$ 354 may be determined by the system 120, for example, from content system 125. $M_1(t)$ may represent the source data for the noise content $S_N(t)$ 145 being output by device 110*b* in room 133. $M_2(t)$ may represent the source data for the desired audio $S_D(t)$ 354 to be output by device 110*a* in room 131. $M_1(t)$ and $M_2(t)$ may be continuous-time waveforms represented by digital audio data—such signals effectively occur at the output of the digital-to-analog converter in audio playback systems, such as music playback and others. The cancellation audio $S_C(t)$ 352 may be represented as:

$$S_C(t)=h_C(t)*M_1(t-\Delta t)) \quad \text{(Equation 4)}$$

Where, the compensating response for mitigation of unwanted sound should satisfy $$h_C(t)*h_{a\text{-}to\text{-}c}(t)=-h_{b\text{-}to\text{-}c}(t) \quad \text{(Equation 5)}$$

In the frequency domain, the convolution in Equation 5 becomes a multiplication and the Fourier transform of $h_C(t)$ (i.e., $H_C(f)$) can be obtained by a division of $-H_{b\text{-}to\text{-}c}(f)$ by $H_{a\text{-}to\text{-}c}(f)$ in the frequency domain. A subsequent inverse Fourier transform yields $h_C(t)$. The processing delay required to compute $h_C(t)$, and to ensure the noise content $S_N(t)$ 145 arrives at the user location at the same time as the output audio $S_O(t)$ 350, is represented by Δt. Timing information representing this delay may be used to control the timing of the output of the noise content $S_N(t)$ 145 (for example by buffering its source data for a certain delay period) thus ensuring synchronization of the audio output between devices 110*a* and 110*b*.

If the first user 5*a* in the first room 131 wishes to listen to certain desired audio $S_D(t)$ 354, the source data $M_2(t)$ for the desired audio $S_D(t)$ 354 may be added to the data representing the cancellation audio $S_C(t)$ 352 to determine the output audio $S_O(t)$ 350 as shown:

$$S_O(t)=h_C(t)*M_1(t-\Delta t))+M_2(t-\Delta t) \quad \text{(Equation 6)}$$

where the noise content $S_N(t)$ 145 is delayed for output by device 110*b* by the device 110*b* and/or server 120 by as much as Δt seconds as well to allow for the synchronization required for destructive interference of the sound waves of the noise content $S_N(t)$ 145 at the location of the first user 5*a*. Although not illustrated, the system 120 may also coordinate a certain delay to the output of the output audio $S_O(t)$ 350 to ensure proper synchronization.

The system 120 may perform the calibration operation(s) to determine acoustic response data during a time when the devices in question are not otherwise in operation. For example, the system 120 may output and detect calibration signals using devices, such as those shown in FIG. 2, when a home is unoccupied by users or at some similar time. The system 120 may determine the time for such calibration operation(s) on its own or such operations may be scheduled and/or initiated by a user.

The system 120 may rely on the acoustic response data of such calibration operation(s) during noise cancellation as described above. And/or the system 120 may perform additional calibration operation(s) as part of processing a noise cancellation request to attempt more precise noise cancellation. In such a situation, after receiving a request to perform noise cancellation, the system 120 may conduct additional calibration operation(s) as described above, particularly with regard to measuring acoustic response as detected by device 110*c*, so the system 120 has the most up-to-date information about the location of first user 5*a*. This may involve outputting and capturing calibration signal(s) between receipt of the noise cancellation request and performance of noise cancellation. To reduce the time between receipt of the noise cancellation request and performance of noise cancellation, the system 120 may only perform such "real time" determination of acoustic response information for device 110*c* and may rely on previous calculations of acoustic response data with regard to the acoustic response of device 110*a* or other devices that are more likely to be stationary and will be unlikely to have moved since the most recent calibration operation(s). Similarly, if not much time has elapsed since a recent calibration operation(s), the system 120 may use acoustic response data already determined for device 110*c* without output of any further calibration signals. Further, the system 120 may determine that for a particular noise cancellation operation that the device 110*a* and the user 5*a* may be sufficiently co-located, and thus use of acoustic response data relative to device 110*c* may be unnecessary.

Figure 4A:
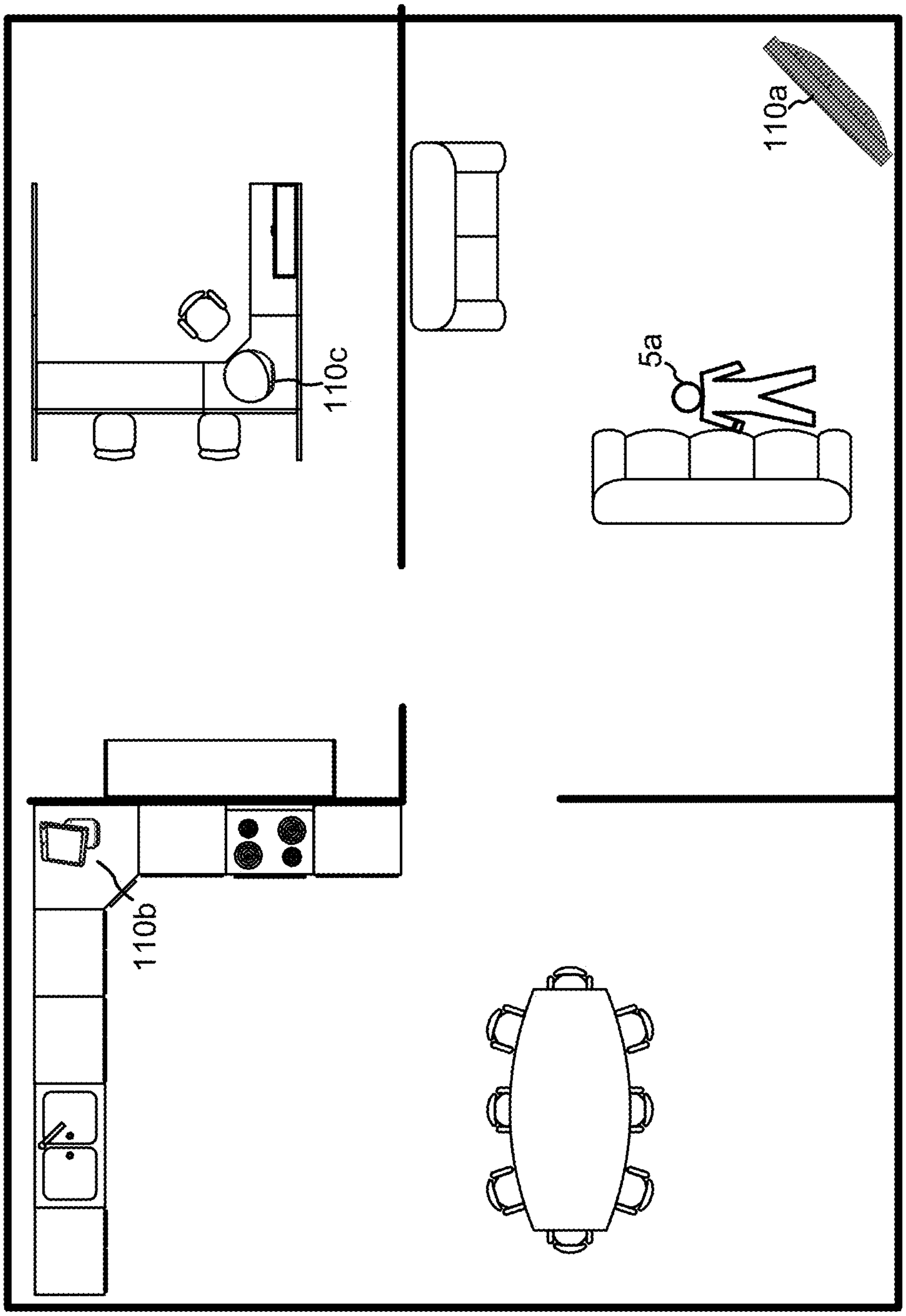
FIGS. 4A-4B illustrate examples of determination of acoustic response data for coordinated multi-device noise cancellation, according to embodiments of the present disclosure.
Figure 4B:
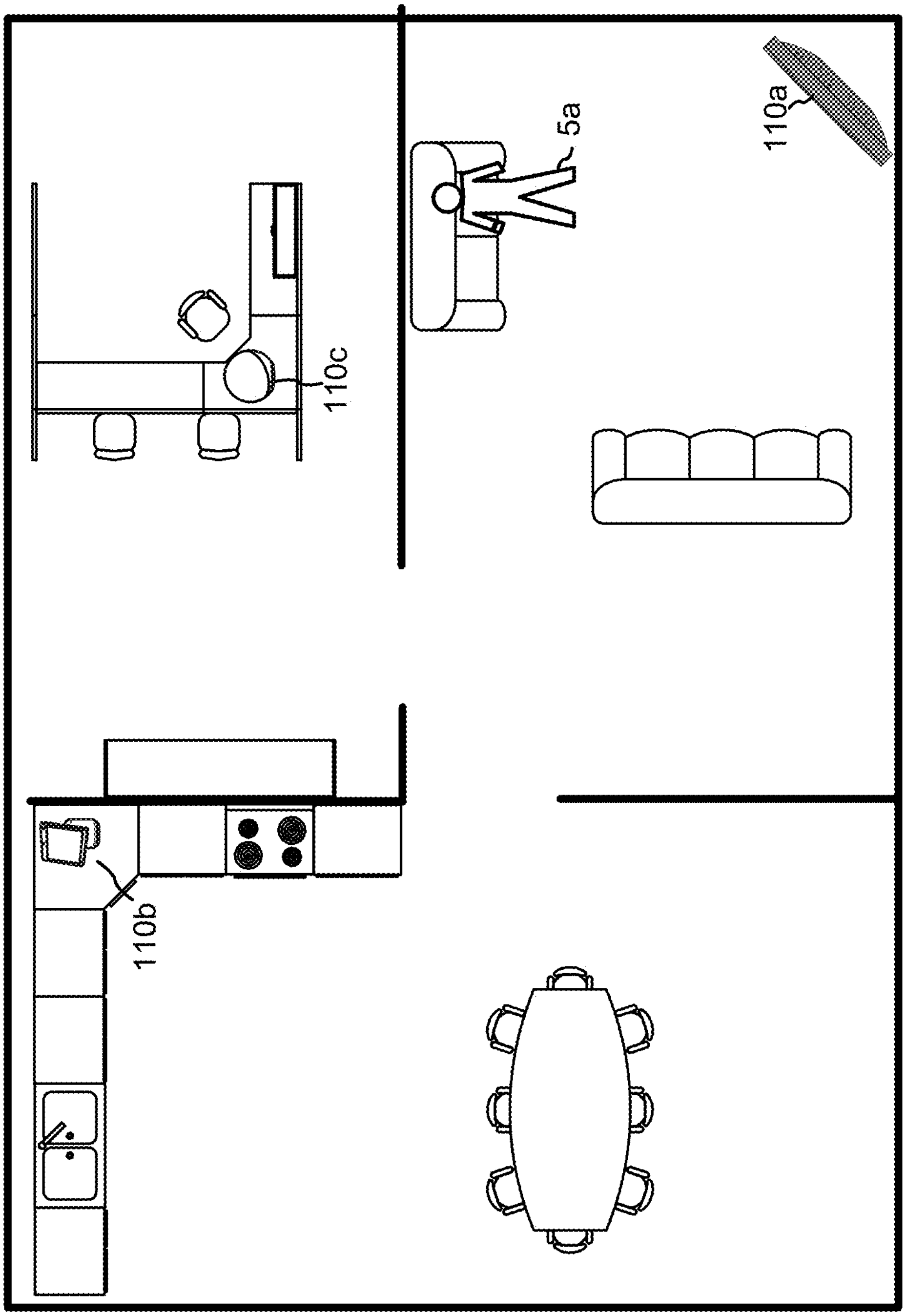

The system 120 also may be configured to store acoustic response data to be used at a later time depending on user location information that may be otherwise available. For example, as shown in situation 400 of FIG. 4A, a user may be located in one room of the house while wearing (or otherwise having on the user's person) device 110*c*. The user 5*a* may thus instruct the system 120 to perform a calibration operation but with information about the user's location. For example, the user may speak a command such as "Alexa, perform calibration. I am on the couch in the living room." The system 120 may use the speech processing components described below in reference to FIG. 6 to determine that the user spoke a command to perform calibration and that the user is located "on the couch" "in the living room." The system 120 may then perform calibration operation(s) and store the resulting acoustic response data (for example, in a manner associated with the user profile of the user 5*a*) in a manner associated with the labels "couch" and "living room." Thus, at a later time, when the user initiates a noise cancellation operation, if the system 120 determines that the user is on the couch in the living room, the system 120 may use the previously determined acoustic response data associated with that location. Similarly, as shown in situation 402 of FIG. 4B, the user may perform the same calibration operation at a different location. For example, the user may speak a command such as "Alexa, perform calibration. I am on the loveseat in the living room." The system 120 may then perform calibration operation(s) and store the resulting acoustic response data (for example, in a manner associated with the user profile of the user 5*a*) in a manner associated with the labels "loveseat" and "living room."

Similar calibration operations may be performed without the precise labels as "couch", "loveseat", etc. For example, the system 120 may perform calibration operations with the user 5*a* at different locations in a room/home and may simply label the resulting acoustic response data as "location A-1", "location A-2", "location B-1", or the like, and at runtime of a noise cancellation operation may determine the user's location and use the appropriate acoustic response data corresponding to that location.

During runtime the system 120 may determine the user's location in a number of ways and/or combinations thereof. In one example, the user may speak the user's location and the system 120 may, as part of speech processing operations, determine the user's location and thus retrieve and use the corresponding acoustic response data. In another example, the user may be in possession of a device (such as a wearable, mobile device, etc.) that the system 120 may use to determine the user's location. (Such a device may be device 110*c* or may be a different device.) The system 120 may also determine the user's location using presence detection components (not shown) which may determine a user's position in an environment. The system 120 may also use image data, for example captured by one or more cameras the user has configured in a home to perform image processing to determine the user's location. The system 120 may also determine the user's location by using the user's spoken command to determine which device 110 is closest to the user. Once the system 120 has estimated the user's location, the system 120 may then use the acoustic response data for that location in the noise cancellation operations. Such acoustic response data may be stored, for example with regard to a user profile stored with profile storage 670 discussed below.

If the system 120 determines that a user 5*a* has moved during a noise cancellation operation, the system 120 may determine updated acoustic response data (for example from a stored lookup table or the like) and may use the updated acoustic response data for the further noise cancellation.

Figure 5:
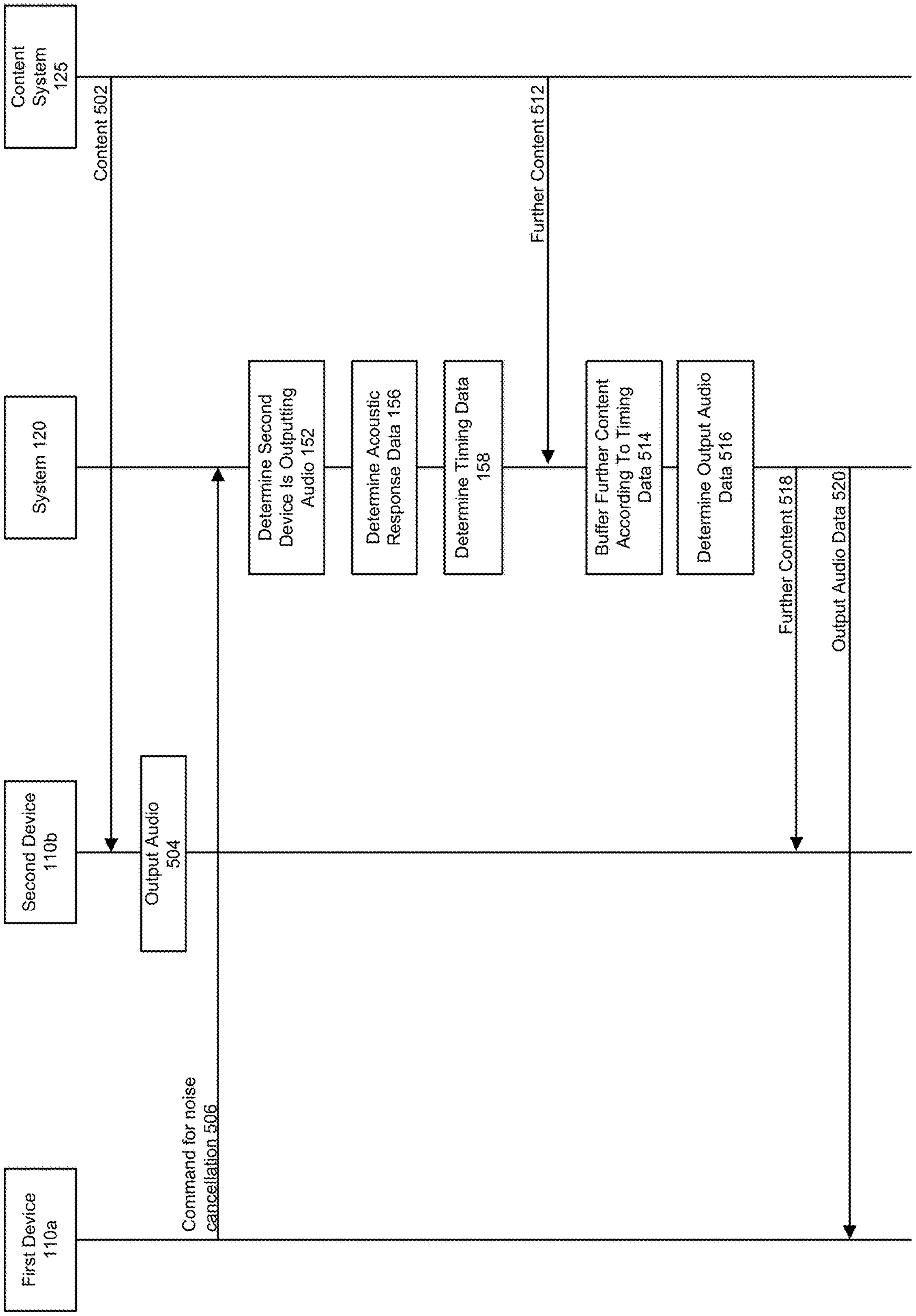
FIG. 5 illustrates data flow when performing operations for coordinated multi-device noise cancellation, according to embodiments of the present disclosure.

FIG. 5 illustrates data flow when performing operations for coordinated multi-device noise cancellation, according to embodiments of the present disclosure.

As shown in FIG. 5 a content system 125 sends source data for content 502 to a second device 110*b*. (Such content may also be sent through system 120 prior to arriving at second device 110*b*.) The second device 110*b* may output (504) audio corresponding to the content. That audio may cause disturb a user in an environment of the first device 110*a*. The first device 110*a* then receives a command for noise cancellation which is then sent (506) to the system 120. The system may determine (152) that the second device is outputting audio. This may be done by processing the command for noise cancellation to identify a source of the noise (e.g., "Alexa, cancel the music coming from downstairs"). Alternatively, or in addition, the system 120 may use information (such as a user profile or other profile information) linking the first device 110*a* and other nearby devices (such as the second device 110*b*) to determine the second device 110*b* is outputting audio. The system 120 may determine (156) acoustic response data corresponding to the acoustic response between the second device 110*b* and first device 110*a* (and potentially between the second device 110*b* and another device 110*c*). Such a determination may rely on prior calibration operation(s) and/or the system may perform calibration operation(s) in response to the command for noise cancellation.

The system 120 may determine (158) timing data sufficient to allow for calculation of cancellation audio data and sufficient to coordinate timing of sound waves at a location of a user. The system 120 may receive source data for further content 512 from the content system 125. Such further content 512 may represent a later portion of the earlier content 502. The system 120 may then buffer (514) or otherwise delay the output of audio corresponding to the further content according to the timing data. The system 120 may determine (516) output audio data corresponding to audio to be output by the first device 110*a*. Such output audio data may include cancellation audio data intended to cancel the impact, at the location of a user, of the audio being output by second device 110*b*. Such output audio data may also include a representation of desired audio to be output by the first device 110*a*. The system 120 may send (518) the further content to the second device 110*b* (potentially along with a command and/or the timing data to ensure coordinated output of the resulting audio). The system 120 may also send the output audio data 520 (potentially along with a command and/or the timing data to ensure coordinated output of the resulting audio).

While FIG. 5 illustrates certain operations being performed by system 120, as noted herein, calibration operation(s) and/or noise cancellation operations may be performed by first device 110*a*, second device 110*b*, and/or other components/device(s) depending on the capabilities of such components/device(s) and configuration of system 100.

Referring now to FIG. 6, the following describes example components that may be used to process a user input. The components may reside on system 120 and/or on device 110 and such components may operate in a coordinated manner to perform the speech processing, noise cancellation, and/or other operations as described herein. The user 5 may speak an input, and the first device 110*a* may receive audio 11 representing the spoken user input. For example, the user 5 may say "Alexa, play my music" or "Alexa, perform noise cancellation." In other examples, the user 5 may provide another type of input (e.g., selection of a button, selection of one or more displayed graphical interface elements, perform a gesture, etc.). The first device 110*a* may send input data to the system 120 for processing. In examples where the user input is a spoken user input, the input data may be audio data 611. In other examples, the input data may be text data, or image data.

In the example of a spoken user input, a microphone or array of microphones (of or otherwise associated with the first device 110*a*) may continuously capture the audio 11, and the first device 110*a* may continually process audio data, representing the audio 11, as it is continuously captured, to determine whether speech is detected. The first device 110*a* may use various techniques to determine whether audio data includes speech. In some examples, the first device 110*a* may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the first device 110*a* may implement a classifier configured to distinguish speech from background noise. The classifier may be implemented by techniques such as linear classifiers, support vector machines, and decision trees. In still other examples, the first device 110*a* may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in the audio data representing the audio 11, the first device 110*a* may determine if the speech is directed at the first device 110*a*. In some embodiments, such determination may be made using a wakeword detection component. The wakeword detection component may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component may compare the audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 620 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component detects a wakeword, the first device 110*a* may "wake" and send, to the system 120, the input audio data 611 representing the spoken user input.

The system 120 may include an orchestrator component 630 configured to, among other things, coordinate data transmissions between components of the system 120. The orchestrator component 630 may receive the audio data 611 from the first device 110*a*, and send the audio data 611 to an ASR component 650.

The ASR component 650 transcribes the audio data 611 into ASR output data including one or more ASR hypotheses. An ASR hypothesis may be configured as a textual interpretation of the speech in the audio data 611, or may be configured in another manner, such as one or more tokens. Each ASR hypothesis may represent a different likely interpretation of the speech in the audio data 611. Each ASR hypothesis may be associated with a score (e.g., confidence score, probability score, or the like) representing the associated ASR hypothesis correctly represents the speech in the audio data 611.

The ASR component 650 interprets the speech in the audio data 611 based on a similarity between the audio data 611 and pre-established language models. For example, the ASR component 650 may compare the audio data 611 with models for sounds (e.g., subword units, such as phonemes, etc.) and sequences of sounds to identify words that match the sequence of sounds of the speech represented in the audio data 611.

In at least some instances, instead of the first device 110*a* receiving a spoken natural language input, the first device 110*a* may receive a textual (e.g., typed) natural language input. The first device 110*a* may determine text data representing the textual natural language input, and may send the text data to the system 120, wherein the text data is received by the orchestrator component 630. The orchestrator component 630 may send the text data or ASR output data, depending on the type of natural language input received, to a NLU component 660.

The NLU component 660 processes the ASR output data or text data to determine one or more NLU hypotheses embodied in NLU output data. The NLU component 660 may perform intent classification (IC) processing on the ASR output data or text data to determine an intent of the natural language input. An intent corresponds to an action to be performed that is responsive to the natural language input. To perform IC processing, the NLU component 660 may communicate with a database of words linked to intents. For example, a music intent database may link words and phrases such as "quiet," "volume off," and "mute" to a <Mute> intent. The NLU component 660 identifies intents by comparing words and phrases in ASR output data or text data to the words and phrases in an intents database. In some embodiments, the NLU component 660 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 660 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 660 may be linked to one or more grammar frameworks with entity types to be populated with entity values. Each entity type of a grammar framework corresponds to a portion of ASR output data or text data that the NLU component 660 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 660 may perform NER processing to identify words in ASR output data or text data as subject, object, verb, preposition, etc. based on grammar rules and/or models. Then, the NLU component 660 may perform IC processing using the identified verb to identify an intent. Thereafter, the NLU component 660 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 660 may generate NLU output data including one or more NLU hypotheses, with each NLU hypothesis including an intent and optionally one or more entity types and corresponding entity values. In some embodiments, the NLU component 660 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

The skill shortlisting component 665 is configured to determine a subset of skill components, implemented by or in communication with the system 120, that may perform an action responsive to the (spoken) user input. Without the skill shortlisting component 665, the NLU component 660 may process ASR output data input thereto with respect to every skill component of or in communication with the system 120. By implementing the skill shortlisting component 665, the NLU component 660 may process ASR output data with respect to only the skill components the skill shortlisting component 665 determines are likely to execute with respect to the user input. This reduces total compute power and latency attributed to NLU processing.

The skill shortlisting component 665 may include one or more ML models. The ML model(s) may be trained to recognize various forms of user inputs that may be received by the system 120. For example, during a training period, a skill component developer may provide training data representing sample user inputs that may be provided by a user to invoke the skill component. For example, for a ride sharing skill component, a skill component developer may provide training data corresponding to "get me a cab to [location]," "get me a ride to [location]," "book me a cab to [location]," "book me a ride to [location]," etc.

The system 120 may use the sample user inputs, provided by a skill component developer, to determine other potentially related user input structures that users may try to use to invoke the particular skill component. The ML model(s) may be further trained using these potentially related user input structures. During training, the skill component developer may be queried regarding whether the determined other user input structures are permissible, from the perspective of the skill component developer, to be used to invoke the skill component. The potentially related user input structures may be derived by one or more ML models, and may be based on user input structures provided by different skill component developers.

The skill component developer may also provide training data indicating grammar and annotations.

Each ML model, of the skill shortlisting component 665, may be trained with respect to a different skill component. Alternatively, the skill shortlisting component 665 may implement one ML model per domain, such as one ML model for skill components associated with a weather domain, one ML model for skill components associated with a ride sharing domain, etc.

The sample user inputs provided by a skill component developer, and potentially related sample user inputs determined by the system 120, may be used as binary examples to train a ML model associated with a skill component. For example, some sample user inputs may be positive examples (e.g., user inputs that may be used to invoke the skill component). Other sample user inputs may be negative examples (e.g., user inputs that may not be used to invoke the skill component).

As described above, the skill shortlisting component 665 may include a different ML model for each skill component, a different ML model for each domain, or some other combination of ML models. In some embodiments, the skill shortlisting component 665 may alternatively include a single ML model. This ML model may include a portion trained with respect to characteristics (e.g., semantic characteristics) shared by all skill components. The ML model may also include skill component-specific portions, with each skill component-specific portion being trained with respect to a specific skill component. Implementing a single ML model with skill component-specific portions may result in less latency than implementing a different ML model for each skill component because the single ML model with skill component-specific portions limits the number of characteristics processed on a per skill component level.

The portion, trained with respect to characteristics shared by more than one skill component, may be clustered based on domain. For example, a first portion, of the portion trained with respect to multiple skill components, may be trained with respect to weather domain skill components; a second portion, of the portion trained with respect to multiple skill components, may be trained with respect to music domain skill components; a third portion, of the portion trained with respect to multiple skill components, may be trained with respect to travel domain skill components; etc.

The skill shortlisting component 665 may make binary (e.g., yes or no) determinations regarding which skill components relate to the ASR output data. The skill shortlisting component 665 may make such determinations using the one or more ML models described herein above. If the skill shortlisting component 665 implements a different ML model for each skill component, the skill shortlisting component 665 may run the ML models that are associated with enabled skill components as indicated in a user profile associated with the first device 110*a* and/or the user 5.

The skill shortlisting component 665 may generate an n-best list of skill components that may execute with respect to the user input represented in the ASR output data. The size of the n-best list of skill components is configurable. In an example, the n-best list of skill components may indicate every skill component of, or in communication with, the system 120 as well as contain an indication, for each skill component, representing whether the skill component is likely to execute the user input represented in the ASR output data. In another example, instead of indicating every skill component, the n-best list of skill components may only indicate the skill components that are likely to execute the user input represented in the ASR output data. In yet another example, the skill shortlisting component 665 may implement thresholding such that the n-best list of skill components may indicate no more than a maximum number of skill components. In another example, the skill components included in the n-best list of skill components may be limited by a threshold score, where only skill components associated with a likelihood to handle the user input above a certain score are included in the n-best list of skill components.

The ASR output data may correspond to more than one ASR hypothesis. When this occurs, the skill shortlisting component 665 may output a different n-best list of skill components for each ASR hypothesis. Alternatively, the skill shortlisting component 665 may output a single n-best list of skill components representing the skill components that are related to the multiple ASR hypotheses represented in the ASR output data.

As indicated above, the skill shortlisting component 665 may implement thresholding such that an n-best list of skill components output therefrom may include no more than a threshold number of entries. If the ASR output data includes more than one ASR hypothesis, the n-best list of skill components may include no more than a threshold number of entries irrespective of the number of ASR hypotheses output by the ASR component 650. Additionally or alternatively, the n-best list of skill components may include no more than a threshold number of entries for each ASR hypothesis (e.g., no more than five entries for a first ASR hypothesis, no more than five entries for a second ASR hypothesis, etc.).

Additionally or alternatively to making a binary determination regarding whether a skill component potentially relates to the ASR output data, the skill shortlisting component 665 may generate confidence scores representing likelihoods that skill components relate to the ASR output data. The skill shortlisting component 665 may perform matrix vector modification to obtain confidence scores for all skill components in a single instance of processing of the ASR output data.

An n-best list of skill components including confidence scores that may be output by the skill shortlisting component 665 may be represented as, for example:

Story skill component, 0.67
Recipe skill component, 0.62
Information skill component, 0.57
Music skill component, 0.42

As indicated, the confidence scores output by the skill shortlisting component 665 may be numeric values. The confidence scores output by the skill shortlisting component 665 may alternatively be binned values (e.g., high, medium, low).

The n-best list of skill components may only include entries for skill components having a confidence score satisfying (e.g., meeting or exceeding) a minimum threshold confidence score. Alternatively, the skill shortlisting component 665 may include entries for all skill components associated with enabled skill components of the current user, even if one or more of the skill components are associated with confidence scores that do not satisfy the minimum threshold confidence score.

The skill shortlisting component 665 may consider other data when determining which skill components may relate to the user input represented in the ASR output data as well as respective confidence scores. The other data may include usage history data, data indicating the skill components that are enabled with respect to the first device 110*a* and/or user 5, data indicating a device type of the first device 110*a*, data indicating a speed of the first device 110*a*, a location of the first device 110*a*, data indicating a skill component that was being used to output content via the first device 110*a* when the first device 110*a* received the instant user input, etc.

The thresholding implemented with respect to the n-best list of skill components generated by the skill shortlisting component 665 as well as the different types of other data considered by the skill shortlisting component 665 are configurable.

As described above, the system 120 may perform speech processing using two different components (e.g., the ASR component 650 and the NLU component 660). In at least some embodiments, the system 120 may implement a spoken language understanding (SLU) component 640 configured to process audio data 611 to determine NLU output data.

The SLU component 640 may be equivalent to a combination of the ASR component 650 and the NLU component 660. Yet, the SLU component 640 may process audio data 611 and directly determine the NLU output data, without an intermediate step of generating ASR output data. As such, the SLU component 640 may take audio data 611 representing a spoken natural language input and attempt to make a semantic interpretation of the spoken natural language input. That is, the SLU component 640 may determine a meaning associated with the spoken natural language input and then implement that meaning. For example, the SLU component 640 may interpret audio data 611 representing a spoken natural language input in order to derive a desired action. The SLU component 640 may output a most likely NLU hypothesis, or multiple NLU hypotheses associated with respective confidence or other scores (such as probability scores, etc.).

The system 120 may include a gesture detection component (not illustrated in FIG. 6). The system 120 may receive image data representing a gesture, and the gesture detection component may process the image data to determine a gesture represented therein. The gesture detection component may implement art-/industry-known gesture detection processes.

In embodiments where the system 120 receives non-image data (e.g., text data) representing a gesture, the orchestrator component 630 may be configured to determine what downstream processing is to be performed in response to the gesture.

The system may include a skill selection component 685 is configured to determine a skill component, or n-best list of skill components each associated with a confidence score/value, to execute to respond to the user input. The skill selection component 685 may include a skill component proposal component, a skill component pre-response component, and a skill component ranking component.

The skill component proposal component is configured to determine skill components capable of processing in response to the user input. In addition to receiving the NLU output data, the skill component proposal component may receive context data corresponding to the user input. For example, the context data may indicate a skill component that was causing the first device 110*a* to output content (e.g., music, video, synthesized speech, etc.) when the first device 110*a* captured the user input, one or more skill components that are indicated as enabled in a profile (as stored in the profile storage 670) associated with the user 5, output capabilities of the first device 110*a*, a geographic location of the first device 110*a*, and/or other context data corresponding to the user input.

The skill component proposal component may implement skill component proposal rules. A skill component developer, via a skill component developer device, may provide one or more rules representing when a skill component should be invoked to respond to a user input. In some embodiments, such a rule may be specific to an intent. In such embodiments, if a skill component is configured to execute with respect to multiple intents, the skill component may be associated with more than one rule (e.g., each rule corresponding to a different intent capable of being handled by the skill component). In addition to being specific to an intent, a rule may indicate one or more entity identifiers with respect to which the skill component should be invoked. For further example, a rule may indicate output capabilities of a device, a geographic location, and/or other conditions.

Each skill component may be associated with each rule corresponding to the skill component. As an example, a rule may indicate a video skill component may execute when a user input corresponds to a "Play Video" intent and the device includes or is otherwise associated with a display. As another example, a rule may indicate a music skill component may execute when a user input corresponds to a "PlayMusic" intent and music is being output by a device when the device captures the user input. It will be appreciated that other examples are possible. The foregoing rules enable skill components to be differentially proposed at runtime, based on various conditions, in systems where multiple skill components are configured to execute with respect to the same intent.

The skill component proposal component, using the NLU output data, received context data, and the foregoing described skill component proposal rules, determines skill components configured to process in response to the user input. Thus, in some embodiments, the skill component proposal component may be implemented as a rules engine. In some embodiments, the skill component proposal component may make binary (e.g., yes/no, true/false, etc.) determinations regarding whether a skill component is configured to process in response to the user input. For example, the skill component proposal component may determine a skill component is configured to process, in response to the user input, if the skill component is associated with a rule corresponding to the intent, represented in the NLU output data, and the context data.

In some embodiments, the skill component proposal component may make such binary determinations with respect to all skill components. In some embodiments, the skill component proposal component may make the binary determinations with respect to only some skill components (e.g., only skill components indicated as enabled in the user profile of the user 5).

After the skill component proposal component is finished processing, the skill component pre-response component may be called to execute. The skill component pre-response component is configured to query skill components, determined by the skill component proposal component as configured to process the user input, as to whether the skill components are in fact able to respond to the user input. The skill component pre-response component may take as input the NLU output data including one or more NLU hypotheses, where each of the one or more NLU hypotheses is associated with a particular skill component determined by the skill component proposal component as being configured to respond to the user input.

The skill component pre-response component sends a pre-response query to each skill component determined by the skill component proposal component. A pre-response query may include the NLU hypothesis associated with the skill component, and optionally other context data corresponding to the user input.

A skill component may determine, based on a received pre-response query and optionally other data available to the skill component, whether the skill component is capable of responding to the user input. For example, a skill component may generate a pre-response indicating the skill component can respond to the user input, indicating the skill component needs more data to determine whether the skill component can respond to the user input, or indicating the skill component cannot respond to the user input.

In situations where a skill component's pre-response indicates the skill component can respond to the user input, or indicating the skill component needs more information, the skill component's pre-response may also include various other data representing a strength of the skill component's potential response to the user input. Such other data may positively influence the skill component's ranking by the skill component ranking component of the skill selection component 685. For example, such other data may indicate capabilities (e.g., output capabilities or components such as a connected screen, loudspeaker, etc.) of a device to be used to output the skill component's response; pricing data corresponding to a product or service the user input is requesting be purchased or is requesting information for; availability of a product the user input is requesting be purchased; whether there are shipping fees for a product the user input is requesting be purchased; whether the user 5 already has a profile and/or subscription with the skill component; that the user 5 does not have a subscription with the skill component, but that there is a free trial/tier the skill component is offering; with respect to a taxi skill component, a cost of a trip based on start and end locations, how long the user 5 would have to wait to be picked up, etc.; and/or other data available to the skill component that is related to the skill component's processing of the user input. In some embodiments, a skill component's pre-response may include an indicator (e.g., flag, representing a strength of the skill component's ability to personalize its response to the user input).

In some embodiments, a skill component's pre-response may be configured to a pre-defined schema. By requiring pre-responses to conform to a specific schema (e.g., by requiring skill components to only be able to provide certain types of data in pre-responses), new skill components may be onboarded into the skill component selection functionality without needing to reconfigure the skill selection component 685 each time a new skill component is onboarded. Moreover, requiring pre-responses to conform to a schema limits the amount of values needed to be used to train and implement a ML model for ranking skill components.

In some embodiments, a skill component's pre-response may indicate whether the skill component requests exclusive display access (i.e., whether the skill component requests its visual data be presented on an entirety of the display).

After the skill component pre-response component queries the skill components for pre-responses, the skill component ranking component may be called to execute. The skill component ranking component may be configured to select a single skill component, from among the skill components determined by the skill component proposal component, to respond to the user input. In some embodiments, the skill component ranking component may implement a ML model. In some embodiments, the ML model may be a deep neural network (DNN).

The skill component ranking component may take as input the NLU output data, the skill component pre-responses, one or more skill component preferences of the user 5 (e.g., as represented in a user profile or group profile stored in the profile storage 670), NLU confidence scores of the NLU output data, a device type of the first device 110*a*, data indicating whether the first device 110*a* was outputting content when the user input was received, and/or other context data available to the skill component ranking component.

The skill component ranking component ranks the skill components using the ML model. Things that may increase a skill component's ranking include, for example, that the skill component is associated with a pre-response indicating the skill component can generate a response that is personalized to the user 5, that a NLU hypothesis corresponding to the skill component is associated with a NLU confidence score satisfying a condition (e.g., a threshold NLU confidence score) that the skill component was outputting content via the first device 110*a* when the first device 110*a* received the user input, etc. Things that may decrease a skill component's ranking include, for example, that the skill component is associated with a pre-response indicating the skill component cannot generate a response that is personalized to the user 5, that a NLU hypothesis corresponding to the skill component is associated with a NLU confidence score failing to satisfy a condition (e.g., a threshold NLU confidence score, etc.).

The skill component ranking component may generate a score for each skill component determined by the skill component proposal component, where the score represents a strength with which the skill component ranking component recommends the associated skill component be executed to respond to the user input. Such a confidence score may be a numeric score (e.g., between 0 and 1) or a binned score (e.g., low, medium, high).

The system 120 may include or otherwise communicate with one or more skill components 625. A skill component 625 may process NLU output data and perform one or more actions in response thereto. For example, for NLU output data including a <PlayMusic> intent, an "artist" entity type, and an artist name as an entity value, a music skill component may output music sung by the indicated artist. For further example, for NLU output data including a <TurnOn> intent, a "device" entity type, and an entity value of "lights," a smart home skill component may cause one or more "smart" lights to operate in an "on" state. In another example, for NLU output data including an <OutputWeather> intent, a "location" entity type, and an entity value corresponding to a geographic location of the first device 110*a*, a weather skill component may output weather information for the geographic location. For further example, for NLU output data including a <BookRide> intent, a taxi skill component may book a requested ride. In another example, for NLU output data including a <BuyPizza> intent, a restaurant skill component may place an order for a pizza. In another example, for NLU output data including an <OutputStory> intent and a "title" entity type and corresponding title entity value, a story skill component may output a story corresponding to the title.

A skill component may operate in conjunction between the first device 110*a*/system 120 and other devices, such as a restaurant electronic ordering system, a taxi electronic booking system, etc. in order to complete certain functions. Inputs to a skill component may come from speech processing interactions or through other interactions or input sources.

A skill component may be associated with a domain, a non-limiting list of which includes a smart home domain, a music domain, a video domain, a weather domain, a communications domain, a flash briefing domain, a shopping domain, and a custom domain.

The skill component 625 may process to determine output data responsive to the spoken user input (e.g., based on the intent and entity data as represented in the NLU output data received by the skill component 625). The skill component 625 may be in communication with skill system(s) 125 which may perform various operations related to the execution/operation of a respective skill 625. A skill system(s) 125 may include a content provider that may provide audio content for various devices as discussed herein.

The system 120 may include a TTS component 680 that generates audio data including synthesized speech. The TTS component 680 is configured to generate output audio data including synthesized speech. The TTS component 680 may perform speech synthesis using one or more different methods. In one method of synthesis called unit selection, the TTS component 680 matches a database of recorded speech against the data input to the TTS component 680. The TTS component 680 matches the input data against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file, such as its pitch, energy, etc., as well as other information, such as where the phonetic unit appears in a word, sentence, or phrase, the neighboring phonetic units, etc. Using all the information in the unit database, the TTS component 680 may match units to the input data to create a natural sounding waveform. The unit database may include multiple examples of phonetic units to provide the TTS component 680 with many different options for concatenating units into speech. One benefit of unit selection is that, depending on the size of the database, a natural sounding speech output may be generated. The larger the unit database, the more likely the TTS component 680 will be able to construct natural sounding speech.

Unit selection speech synthesis may be performed as follows. Unit selection includes a two-step process. First the TTS component 680 determines what speech units to use and then it combines them so that the particular combined units match the desired phonemes and acoustic features to create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well a given speech unit matches the features of a desired speech output (e.g., pitch, prosody, etc.). A join cost represents how well a speech unit matches a consecutive speech unit for purposes of concatenating the speech units together in the eventual synthesized speech. The overall cost function is a combination of target cost, join cost, and other costs that may be determined by the TTS component 680. As part of unit selection, a unit selection engine may choose the speech unit with the lowest overall combined cost. For example, a speech unit with a very low target cost may not necessarily be selected if its join cost is high.

In another method of synthesis called parametric synthesis, parameters such as frequency, volume, noise, etc. are varied by the TTS component 680 to create an artificial speech waveform output. Parametric synthesis may use an acoustic model and various statistical techniques to match data, input to the TTS component 680, with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio output.

Parametric speech synthesis may be performed as follows. The TTS component 680 may include an acoustic model, or other models, which may convert data, input to the TTS component 680, into a synthetic acoustic waveform based on audio signal manipulation. The acoustic model includes rules that may be used to assign specific audio waveform parameters to input phonetic units and/or prosodic annotations. The rules may be used to calculate a score representing a likelihood that a particular audio output parameter(s), such as frequency, volume, etc., corresponds to the portion of the input data.

The TTS component 680 may use a number of techniques to match speech to be synthesized with input phonetic units and/or prosodic annotations. One common technique is using Hidden Markov Models (HMMs). HMIs may be used to determine probabilities that audio output should match textual input. HMMs may be used to translate from parameters from the linguistic and acoustic space to the parameters to be used by a vocoder (i.e., a digital voice encoder) to artificially synthesize the desired speech. Using HMIs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts, such as the phoneme identity, stress, accent, position, etc. An initial determination of a probability of a potential phoneme may be associated with one state. As new text is processed by the TTS component 680, the state may change or stay the same, based on the processing of the new text. For example, the pronunciation of a previously processed word might change based on later processed words. A Viterbi algorithm may be used to find the most likely sequence of states based on the processed text. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the TTS component 680 may also calculate potential states for other potential audio outputs, such as various ways of pronouncing phoneme /E/, as potential acoustic matches for the phonetic unit. In this manner multiple states and state transition probabilities may be calculated.

The probable states and probable state transitions calculated by the TTS component 680 may lead to a number of potential audio output sequences. Based on the acoustic model and other potential models, the potential audio output sequences may be scored according to a confidence level of the TTS component 680. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input data.

The system 120 may include a user recognition component 695. The user recognition component 695 may recognize one or more users using various data. The user recognition component 695 may take as input the audio data 611. The user recognition component 695 may perform user recognition by comparing speech characteristics, in the audio data 611, to stored speech characteristics of users. The user recognition component 695 may additionally or alternatively perform user recognition by comparing biometric data (e.g., fingerprint data, iris data, retina data, etc.), received by the system 120 in correlation with a natural language input, to stored biometric data of users. The user recognition component 695 may additionally or alternatively perform user recognition by comparing image data (e.g., including a representation of at least a feature of a user), received by the system 120 in correlation with a natural language input, with stored image data including representations of features of different users. The user recognition component 695 may perform other or additional user recognition processes, including those known in the art. For a particular natural language input, the user recognition component 695 may perform processing with respect to stored data of users associated with the first device 110*a* that received the natural language input.

The user recognition component 695 determines whether a natural language input originated from a particular user. For example, the user recognition component 695 may determine a first value representing a likelihood that a natural language input originated from a first user, a second value representing a likelihood that the natural language input originated from a second user, etc. The user recognition component 695 may also determine an overall confidence regarding the accuracy of user recognition processing.

The user recognition component 695 may output a single user identifier corresponding to the most likely user that originated the natural language input. Alternatively, the user recognition component 695 may output multiple user identifiers (e.g., in the form of an N-best list) with respective values representing likelihoods of respective users originating the natural language input. The output of the user recognition component 695 may be used to inform NLU processing, processing performed by a skill component 625, as well as processing performed by other components of the system 120 and/or other systems.

The system 120 may include profile storage 670. The profile storage 670 may include a variety of data related to individual users, groups of users, devices, etc. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill component enablement data; and/or other data.

The profile storage 670 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill component identifiers of skill components that the user has enabled. When a user enables a skill component, the user is providing permission to allow the skill component to execute with respect to the user's inputs. If a user does not enable a skill component, the skill component may be prevented from processing with respect to the user's inputs.

The profile storage 670 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 670 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

The profile storage 670 may include profile information that links devices in a home or other close environment for noise cancellation purposes. Thus, a profile (or plurality of profiles) may include information that may be used by the system 120 to determine which devices may potentially cause noise in the environment of other devices for present purposes. A profile may also store acoustic response data determined from one or more calibration operation(s) discussed herein.

The system 100 may also include an audio coordination component 645. Such a component may be used to perform and coordinate calibration operations and noise cancellation operations such as those described above in reference to FIGS. 1-5.

Figure 7:
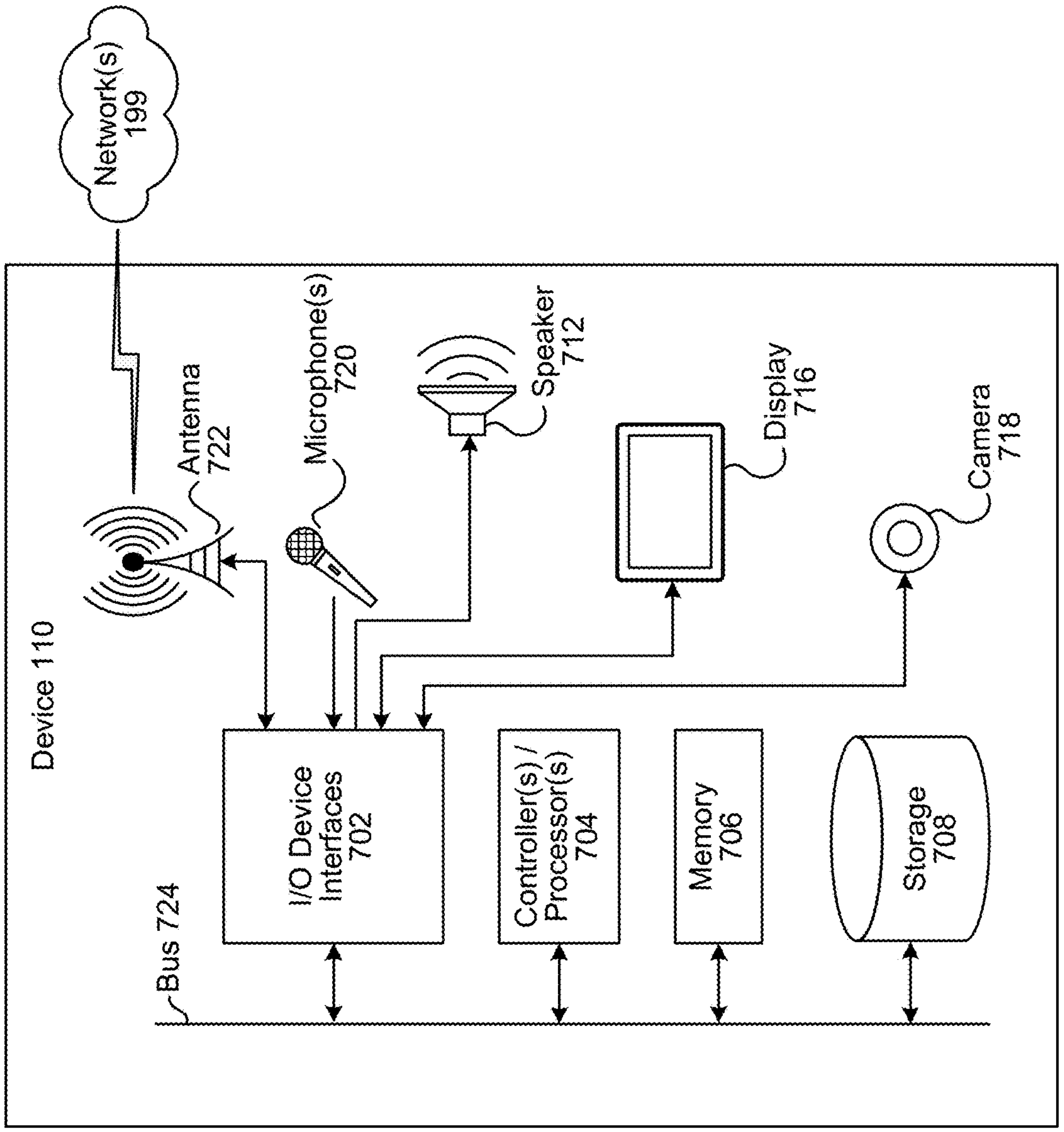
FIG. 7 is a block diagram conceptually illustrating example components of a device, according to embodiments of the present disclosure.
Figure 8:
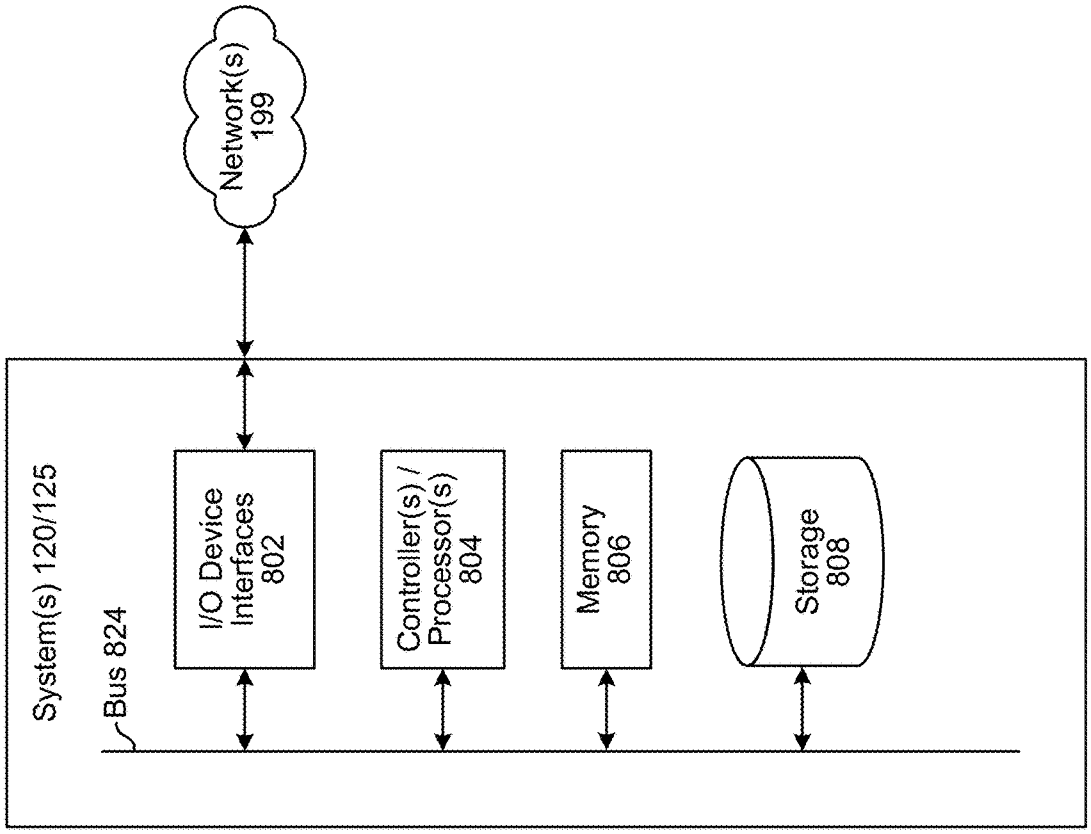
FIG. 8 is a block diagram conceptually illustrating example components of a system, according to embodiments of the present disclosure.

FIG. 7 is a block diagram conceptually illustrating a device 110 that may be used with the system. FIG. 8 is a block diagram conceptually illustrating example components of a remote device, such as the system(s) 120 and/or system(s) 125. A system (120/125) may include one or more servers. The device 110, in certain embodiments, may also include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques. The system 120 may correspond to a cloud-type system and/or may include a home server that resides in a home of a user (for example, the same home as devices 110-1 and 110-2) and coordinates audio management/performs operations such as those described herein either on its own or using other device(s)/system(s) to do so.

Multiple systems (120/125) may be included in the overall system 100 of the present disclosure, such as one or more systems 120 for training a machine learning model, and one or more systems 125 for operating such a model to perform various tasks. Such tasks may depend on the configuration of the trained machine learning component(s)/model(s) and may include, for example, image processing (such as computer vision, object identification, object recognition, etc.), audio processing (such as speech processing, sentiment detection, voice identification, etc.), data analysis, or a variety of other tasks. In operation, each of these systems may include computer-readable and computer-executable instructions that reside on the respective device (120/125), as will be discussed further below.

Each of these devices (110/120/125) may include one or more controllers/processors (704/804), which may each include a central processing unit (CPU) for processing data and computer-readable instructions, and a memory (706/806) for storing data and instructions of the respective device. The memories (706/806) may individually include volatile random access memory (RAM), non-volatile read only memory (ROM), non-volatile magnetoresistive memory (MRAM), and/or other types of memory. Each device (110/120/125) may also include a data storage component (708/808) for storing data and controller/processor-executable instructions. Each data storage component (708/808) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (702/802).

Computer instructions for operating each device (110/120/125) and its various components may be executed by the respective device's controller(s)/processor(s) (704/804), using the memory (706/806) as temporary "working" storage at runtime. A device's computer instructions may be stored in a non-transitory manner in non-volatile memory (706/806), storage (708/808), or an external device(s). Alternatively, some or all of the executable instructions may be embedded in hardware or firmware on the respective device in addition to or instead of software.

Each device (110/120/125) includes input/output device interfaces (702/802). A variety of components may be connected through the input/output device interfaces (702/802), as will be discussed further below. Additionally, each device (110/120/125) may include an address/data bus (724/824) for conveying data among components of the respective device. Each component within a device (110/120/125) may also be directly connected to other components in addition to (or instead of) being connected to other components across the bus (724/824).

Referring to FIG. 7, the device 110 may include input/output device interfaces 702 that connect to a variety of components such as an audio output component such as a speaker 712, a wired headset or a wireless headset (not illustrated), or other component capable of outputting audio. The device 110 may also include an audio capture component. The audio capture component may be, for example, a microphone 720 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 716 for displaying content. The device 110 may further include a camera 718.

Via antenna(s) 722, the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (702/802) may also include communication components that allow data to be exchanged between devices such as different physical servers in a collection of servers or other components.

The components of the device(s) 110, the system(s) 120, or system 125 may include their own dedicated processors, memory, and/or storage. Alternatively, one or more of the components of the device(s) 110, system(s) 120, or a system 125 may utilize the I/O interfaces (702/802), processor(s) (704/804), memory (706/806), and/or storage (708/808) of the device(s) 110, system(s) 120, or the system 125, respectively.

As noted above, multiple devices may be employed in a single system. In such a multi-device system, each of the devices may include different components for performing different aspects of the system's processing. The multiple devices may include overlapping components. The components of the device 110, the system(s) 120, and a system 125, as described herein, are illustrative, and may be located as a stand-alone device or may be included, in whole or in part, as a component of a larger device or system.

Figure 9:
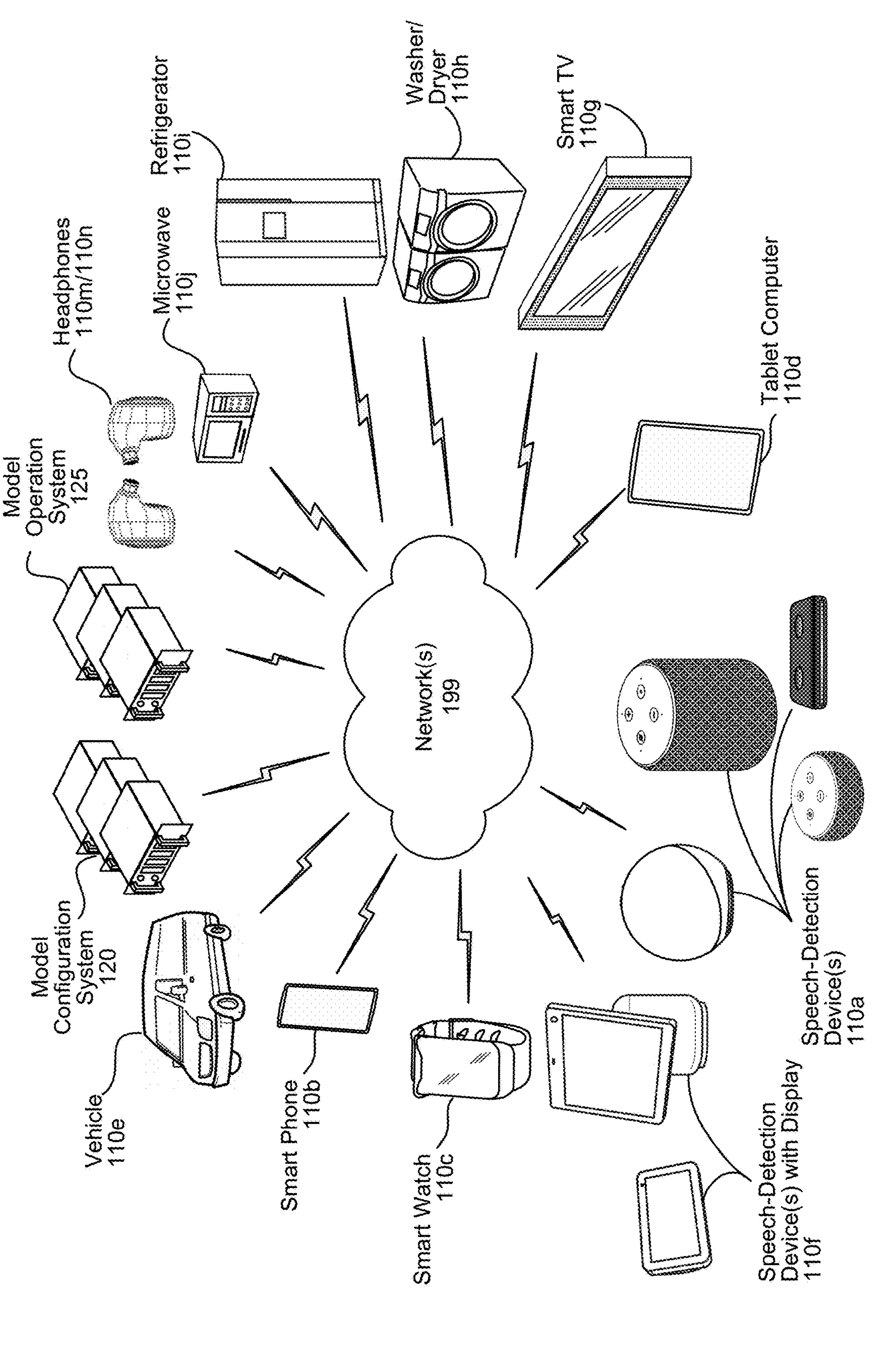
FIG. 9 illustrates an example of a computer network for use with the overall system, according to embodiments of the present disclosure.

As illustrated in FIG. 9, multiple devices (110*a*-110*n*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the configuration system(s) 120, the system(s) 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving, by a remote server, from a first device associated with a first user profile and located in a first room of a home, a command to enable noise cancellation;

determining, by the remote server, using the first user profile, a second device located in a second room of the home;

determining that the second device is outputting first content;

determining source data corresponding to the first content;

retrieving stored acoustic response data associated with the first room, the stored acoustic response data corresponding to detection, by the first device, of calibration audio output by the second device;

estimating a time for performing noise cancellation with respect to the first device;

determining, based at least in part on the stored acoustic response data and the source data, output audio data configured to at least partially cancel a representation of the first content, the representation corresponding to the first room;

causing the second device to output the first content with a delay corresponding to the time; and causing the first device to output audio corresponding to the output audio data.

2. The computer-implemented method of claim 1, further comprising, prior to receiving the command:

causing the second device to output, the calibration audio;

receiving, from the first device, first input audio data corresponding to detection of the calibration audio by the first device;

receiving, from a third device, second input audio data corresponding to detection of the calibration audio by the third device; and processing the first input audio data and the second input audio data to determine the stored acoustic response data.

3. The computer-implemented method of claim 1, further comprising:

aligning output of delayed first content by the second device and the output audio data by the first device.

4. The computer-implemented method of claim 1, further comprising:

determining second content to be output by the first device; and determining second data representing the second content, wherein determining the output audio data further comprises using the second data, wherein the output audio data includes a representation of the second content and cancels the representation of the first content.

5. A computer-implemented method comprising:

receiving a command to perform noise cancellation with respect to an environment of a first device;

determining that a second device, associated with the first device, is outputting first audio;

determining acoustic response data corresponding to detection, by the first device, of audio presented by the second device;

determining timing data corresponding to performance of the noise cancellation;

causing the second device to output second audio based at least in part on the timing data;

determining, based at least in part on the acoustic response data and first data representing the second audio, output audio data configured to at least partially cancel a representation of the second audio, the representation corresponding to the environment; and causing the first device to output third audio based on the output audio data.

6. The computer-implemented method of claim 5, further comprising:

determining a component corresponding to a source of the first data representing the second audio;

receiving, from the component, the first data representing the second audio; and determining a time delay sufficient to allow for determination of the output audio data based at least in part on the acoustic response data and the first data, wherein causing the second device to output the second audio based at least in part on the timing data comprises:

buffering the first data, and causing the second device to output the second audio according to the time delay.

7. The computer-implemented method of claim 5, further comprising:

causing the second device to output calibration audio;

receiving, from the first device, first input audio data corresponding to detection of the calibration audio by the first device;

receiving, from a third device, second input audio data corresponding to detection of the calibration audio by the third device; and processing the first input audio data and the second input audio data to determine the acoustic response data, wherein the acoustic response data corresponds to detection, by the first device and the second device, of the calibration audio as output by the second device.

8. The computer-implemented method of claim 7, wherein output of the calibration audio occurs after receipt of the command to perform noise cancellation.

9. The computer-implemented method of claim 5, further comprising:

determining position data corresponding to an estimated position of a user in the environment; and based at least in part on the position data, selecting the acoustic response data from a plurality of acoustic response data.

10. The computer-implemented method of claim 9, wherein determining the position data further comprising:

receiving, from the first device, input audio data representing an utterance; and determining, using the utterance, the position data.

11. The computer-implemented method of claim 5, further comprising:

determining a user profile associated with the first device; and identifying the second device based at least in part on the user profile.

12. The computer-implemented method of claim 5, further comprising:

determining, using at least one microphone of the first device, input audio data representing noise in the environment, wherein determining the output audio data is further based at least in part on the input audio data, and wherein the output audio data is configured to at least partially cancel a representation of the noise.

13. A system comprising:

at least one processor; and at least one memory including instructions that, when executed by the at least one processor, cause the system to:

receive a command to perform noise cancellation with respect to an environment of a first device;

determine that a second device, associated with the first device, is outputting first audio;

determine acoustic response data corresponding to detection, by the first device, of audio presented by the second device;

determine timing data corresponding to performance of the noise cancellation;

cause the second device to output second audio based at least in part on the timing data;

determine, based at least in part on the acoustic response data and first data representing the second audio, output audio data configured to at least partially cancel a representation of the second audio, the representation corresponding to the environment; and cause the first device to output third audio based on the output audio data.

14. The system of claim 13, wherein the at least one memory further comprises instructions that, when executed by the at least one processor, further cause the system to:

determine a component corresponding to a source of the first data representing the second audio;

receive, from the component, the first data representing the further audio; and determine a time delay sufficient to allow for determination of the output audio data based at least in part on the acoustic response data and the first data, wherein the instructions that cause the system to cause the second device to output the second audio based at least in part on the timing data comprise instructions that, when executed by the at least one processor, cause the system to:

buffer the first data, and cause the second device to output the second audio according to the time delay.

15. The system of claim 13, wherein the at least one memory further comprises instructions that, when executed by the at least one processor, further cause the system to:

cause the second device to output calibration audio;

receive, from the first device, first input audio data corresponding to detection of the calibration audio by the first device;

receive, from a third device, second input audio data corresponding to detection of the calibration audio by the third device; and process the first input audio data and the second input audio data to determine the acoustic response data, wherein the acoustic response data corresponds to detection, by the first device and the second device, of the calibration audio as output by the second device.

16. The system of claim 15, wherein the output of the calibration audio occurs after receipt of the command to perform noise cancellation.

17. The system of claim 13, wherein the at least one memory further comprises instructions that, when executed by the at least one processor, further cause the system to:

determine position data corresponding to an estimated position of a user in the environment; and based at least in part on the position data, select the acoustic response data from a plurality of acoustic response data.

18. The system of claim 17, wherein the instructions that cause the system to determine the position data comprise instructions that, when executed by the at least one processor, cause the system to:

receive, from the first device, input audio data representing an utterance; and determining, using the utterance, the position data.

19. The system of claim 13, wherein the at least one memory further comprises instructions that, when executed by the at least one processor, further cause the system to:

determine a user profile associated with the first device; and identify the second device based at least in part on the user profile.

20. The system of claim 13, wherein the at least one memory further comprises instructions that, when executed by the at least one processor, further cause the system to:

determine, using at least one microphone of the first device, input audio data representing noise in the environment, wherein determination of the output audio data is further based at least in part on the input audio data, and wherein the output audio data is configured to at least partially cancel a representation of the noise.

* * * * *